United States Patent [19]

Andrea et al.

[11] Patent Number: 5,673,325
[45] Date of Patent: *Sep. 30, 1997

[54] NOISE CANCELLATION APPARATUS

[75] Inventors: Douglas Andrea, Old Brookville; Martin Topf, Brooklyn, both of N.Y.

[73] Assignee: Andrea Electronics Corporation, Long Island City, N.Y.

[*] Notice: The portion of the term of this patent subsequent to Oct. 29, 2012, has been disclaimed.

[21] Appl. No.: 339,126

[22] Filed: Nov. 14, 1994

Related U.S. Application Data

[63] Continuation-in-part of Ser. No. 968,180, Oct. 29, 1992, Pat. No. 5,381,473.

[51] Int. Cl.⁶ .................................................. H04R 3/00
[52] U.S. Cl. ........................... 381/92; 381/71; 381/94; 379/387; 379/419
[58] Field of Search ................... 381/72, 71, 94, 381/93, 168, 92, 83, 68.6, 122, 169; 379/387, 390, 395, 437, 419; 367/124, 126

[56] References Cited

U.S. PATENT DOCUMENTS

| | | |
|---|---|---|
| 2,379,514 | 7/1945 | Fisher ................................ 381/168 |
| 2,972,018 | 2/1961 | Hawley et al. . |
| 3,098,121 | 7/1963 | Wadsworth . |
| 3,394,226 | 7/1968 | Andrews, Jr. . |
| 3,830,988 | 8/1974 | Mol et al. . |
| 3,889,059 | 6/1975 | Thompson et al. . |
| 3,890,474 | 6/1975 | Glicksberg . |
| 4,334,740 | 6/1982 | Wray . |
| 4,463,222 | 7/1984 | Poradowski . |
| 4,589,137 | 5/1986 | Miller ................................... 381/71 |
| 4,672,674 | 6/1987 | Clough et al. . |
| 4,752,961 | 6/1988 | Kahn . |
| 4,783,817 | 11/1988 | Hamada et al. . |
| 4,833,719 | 5/1989 | Carme et al. . |
| 4,985,925 | 1/1991 | Langberg et al. . |
| 5,001,763 | 3/1991 | Moseley . |
| 5,091,954 | 2/1992 | Sasaki et al. . |
| 5,117,461 | 5/1992 | Moseley . |
| 5,121,426 | 6/1992 | Bavmhauer ............................. 381/83 |
| 5,125,032 | 6/1992 | Meister et al. . |
| 5,134,659 | 7/1992 | Moseley . |
| 5,138,663 | 8/1992 | Moseley . |
| 5,138,664 | 8/1992 | Kimura et al. . |
| 5,226,087 | 7/1993 | Ono ........................................ 381/92 |

(List continued on next page.)

FOREIGN PATENT DOCUMENTS

| | | |
|---|---|---|
| 2305909 | 10/1976 | France . |
| 3719963 | 3/1988 | Germany . |
| 4008595 | 9/1991 | Germany . |
| 56-89194 | 7/1981 | Japan ..................................... 381/92 |
| 59-64994 | 4/1984 | Japan ..................................... 381/92 |
| 62-189898 | 8/1987 | Japan ..................................... 381/92 |
| 1314098 | 12/1989 | Japan . |
| 0070152 | 3/1990 | Japan ..................................... 381/71 |
| 3169199 | 7/1991 | Japan . |
| 3231599 | 10/1991 | Japan . |
| 1160431 | 8/1969 | United Kingdom . |
| 1289993 | 9/1972 | United Kingdom . |
| 1378294 | 12/1974 | United Kingdom . |
| 9205538 | 4/1992 | WIPO . |
| 9217019 | 10/1992 | WIPO . |

*Primary Examiner*—Minsun Oh
*Attorney, Agent, or Firm*—Curtis, Morris & Safford, P.C.; Thomas J. Kowalski, Esq.

[57] ABSTRACT

Apparatus for reducing acoustic background noise for use with a telephone handset or a boom microphone device or a boom headset or the like. The apparatus includes first and second microphones which are arranged such that the first microphone receives a desired speech input and the background noise present in the vicinity of the speech, and the second microphone receives substantially only the background noise. The background noise from the second microphone is converted into a corresponding electrical signal and subtracted from a signal corresponding to the speech and background noise obtained from the first microphone so as to produce a signal representing substantially the speech.

13 Claims, 15 Drawing Sheets

U.S. PATENT DOCUMENTS 5,260,997 11/1993 Gattey et al. .
5,276,740 1/1994 Inanaga et al. .
5,327,506 7/1994 Stites, III .
5,381,473 1/1995 Andrea et al. .
5,402,497 3/1995 Nishimoto et al. .
5,414,769 5/1995 Gattey et al. .
5,448,637 9/1995 Yamaguchi et al. .
5,471,538 11/1995 Sasaki ........................................ 381/92

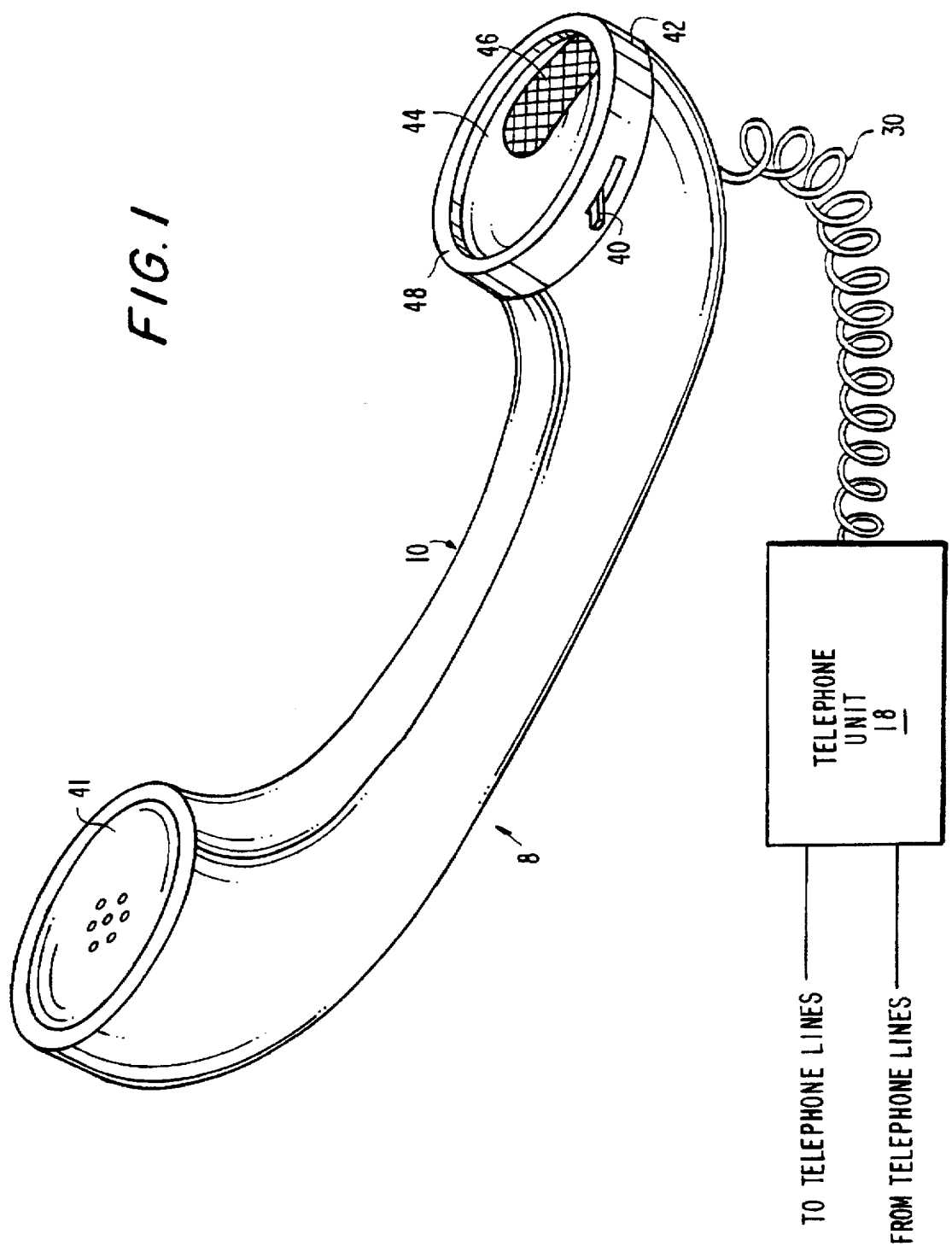

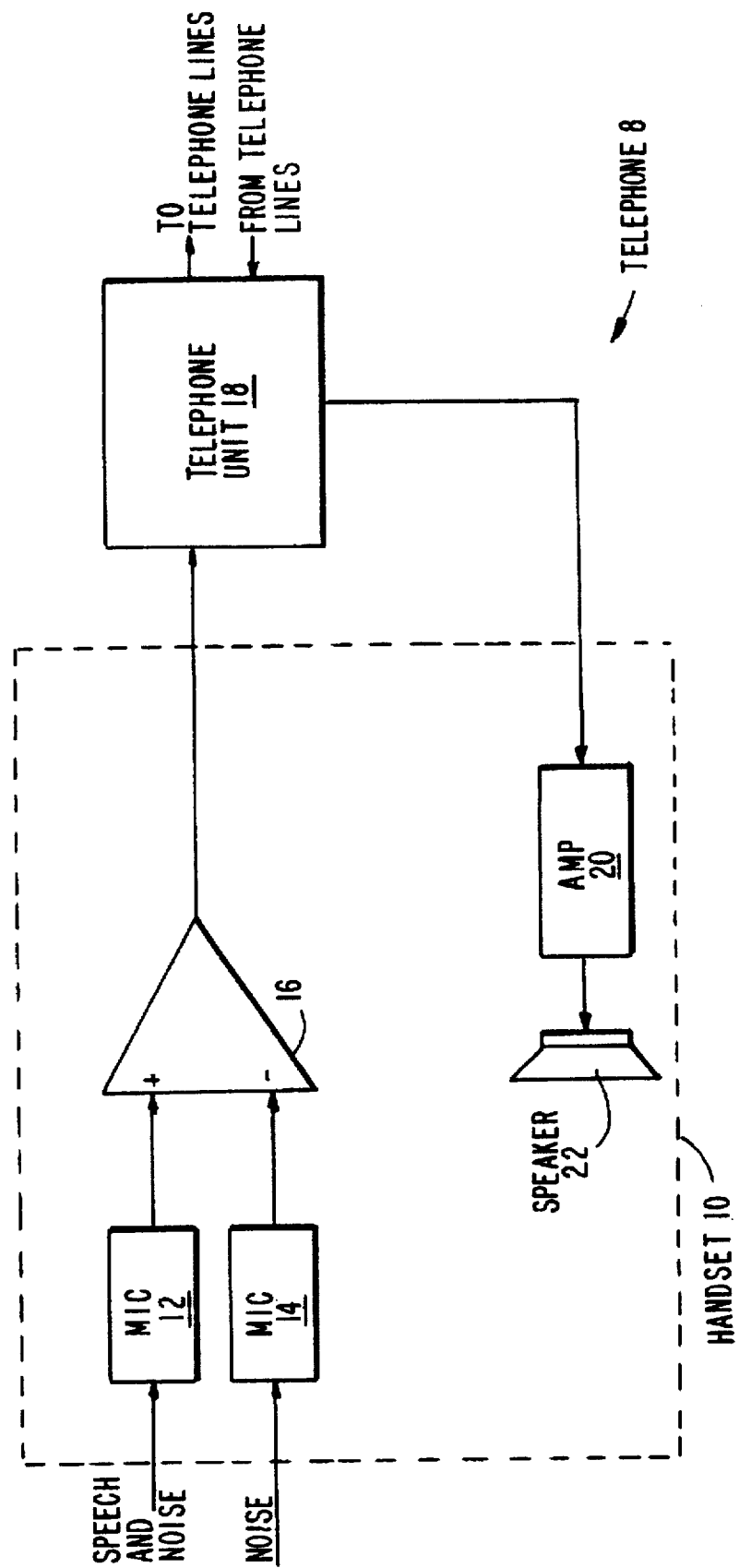

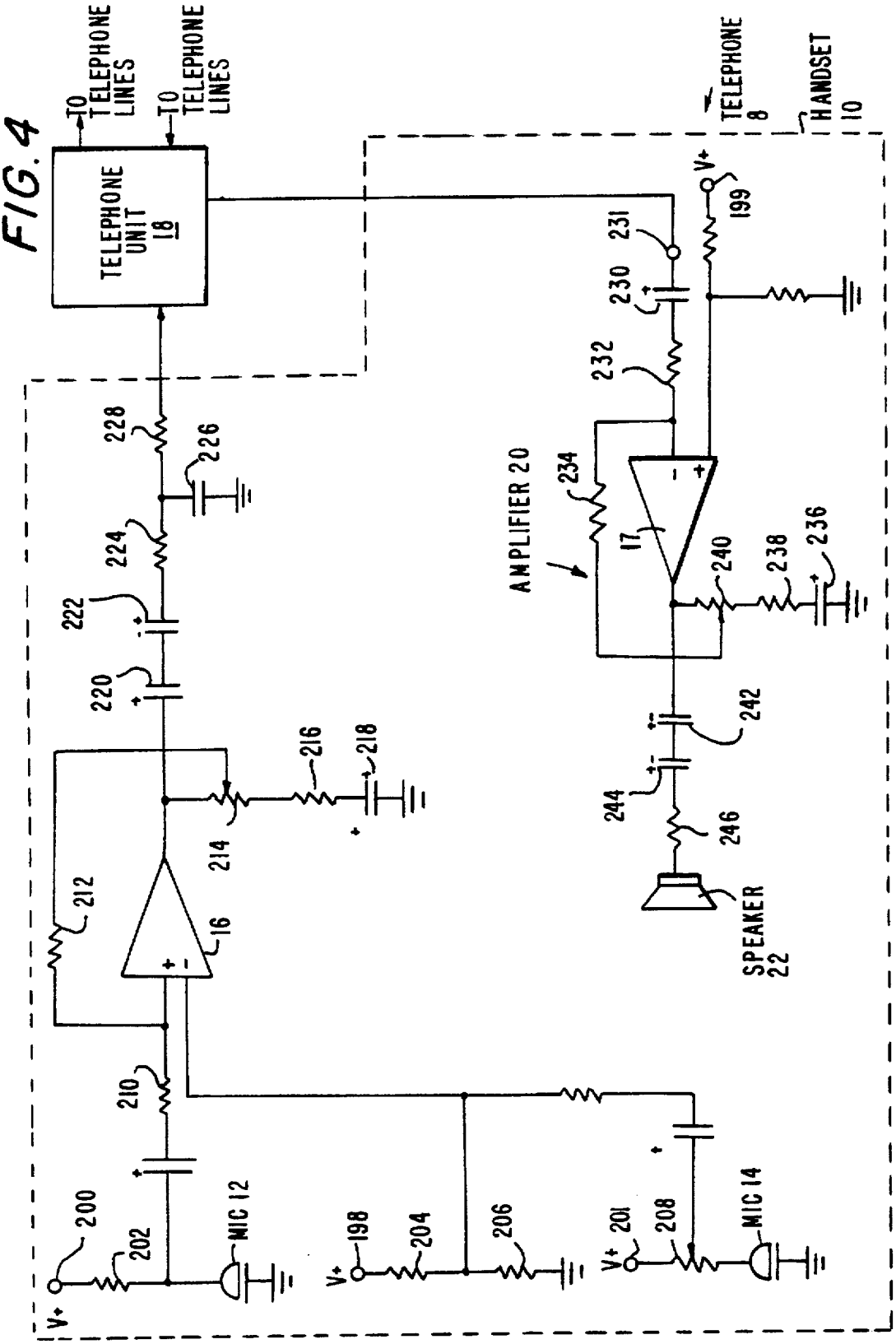

DIRECTION OF SPEECH

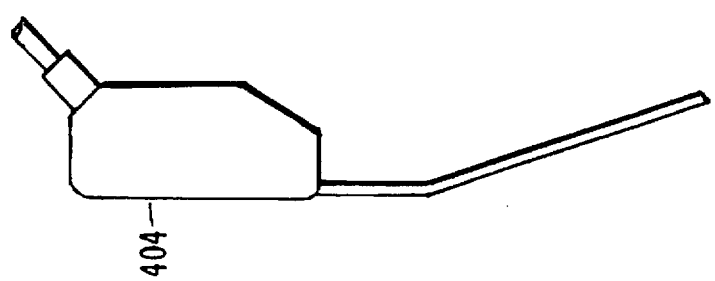
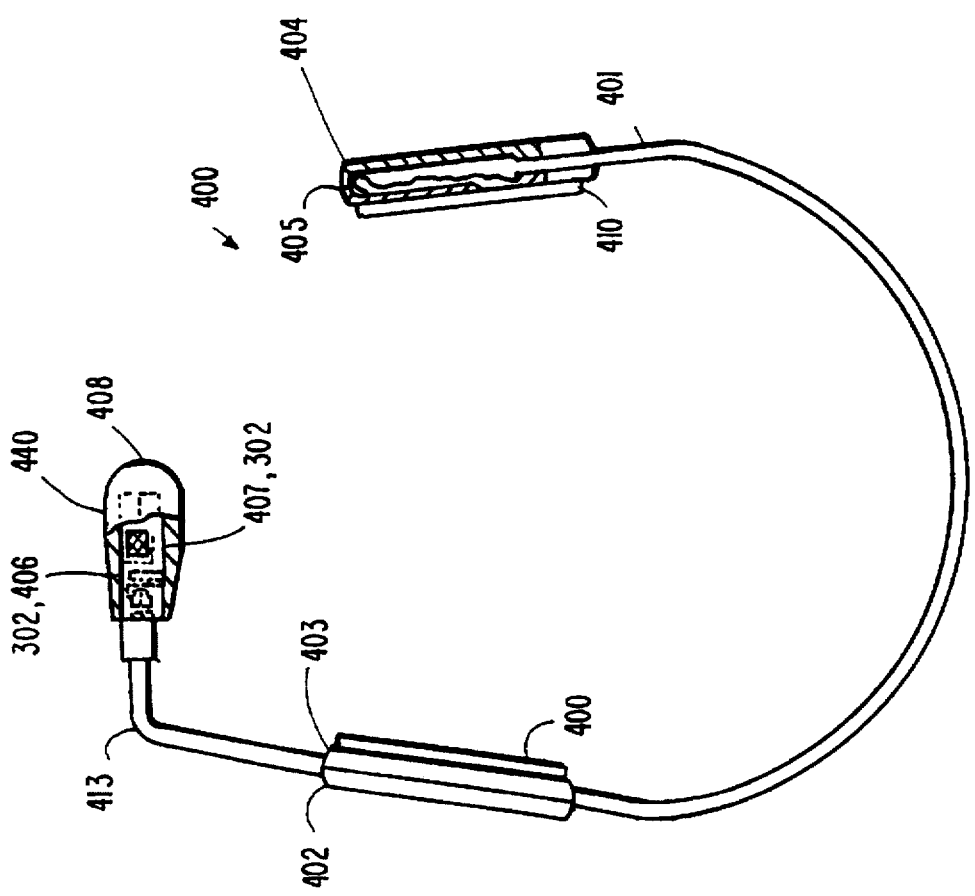
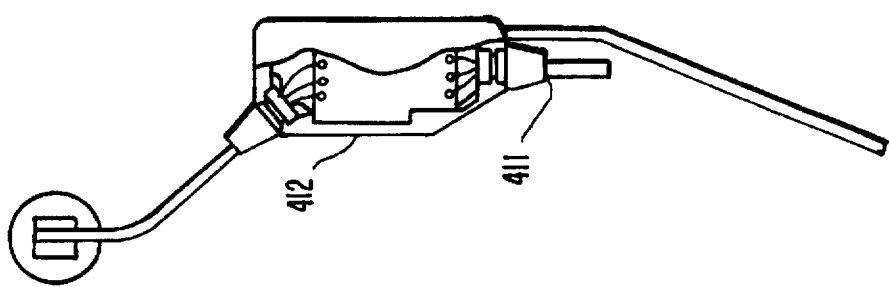

NOISE CANCELLATION APPARATUS

RELATED APPLICATIONS

This application is a continuation-in-part of allowed application Ser. No. 07/968,180, filed Oct. 29, 1992 now U.S. Pat. No. 5,381,473, incorporated herein by reference. Reference is also made to U.S. Pat. No. 5,251,263, issued Oct. 5, 1993 and incorporated herein by reference.

BACKGROUND OF THE INVENTION

1. Field of the Invention

This invention relates to a noise cancellation apparatus and, more particularly, to an apparatus for canceling or reducing background acoustic noise for use with a telephone handset or a boom microphone device or boom headset or the like.

2. Description of the Prior Art

As is to be appreciated, in numerous situations, the presence of background acoustic noise is undesirable. As an example, consider the situation in which an operator is attempting to conduct a telephone conversation from a telephone or such similar device located in a noisy area. In this situation, loud acoustic background noise is received by a microphone in the handset of the telephone and converted to an electrical signal which is supplied to the telephone(s) of the person(s) having the conversation with the operator and is converted thereat to an acoustic signal. As a result, the person to whom the operator is communicating constantly hears the loud background noise. Further, when the person is speaking, such speech is combined with the background noise and, as such, may be difficult for the other person(s) to understand. As a result, the operator may have to shout into the microphone of the telephone. Furthermore, the signal representing the background noise is also supplied from the microphone in the operator's handset to the speaker in the operator's handset. Thus, the operator also constantly hears the background noise from the speaker in the operator's handset and, when the other person is speaking, may impair the understanding thereof.

As another example, consider the situation in which a pilot who is operating a helicopter or the like wishes to communicate with another person by way of radio frequency (RF) communication. In this situation, the pilot typically speaks into a so-called boom microphone or boom headset which is coupled to a radio transmitting/receiving device whereupon the speech is converted into RF signals which are transmitted to a second receiving/transmitting device and converted therein to speech so as to be heard by the other person(s). As with the above situation of a telephone located in a noisy area, the loud background noise from the helicopter is received and converted into an electrical signal by the boom microphone or headset device and thereafter supplied to the receiving device. As a result, the person(s) communicating with the pilot hears the loud background noise. This may be particularly annoying when the pilot leaves the radio transmitting/receiving device in the "ON" position while operating the helicopter.

As yet another example, consider voice verification and/or recognition systems into which an operator must speak for access, for instance to a physical facility or, to operate a computer or automatic teller machine. Background noise can prevent access (no recognition or verification due to background noise) or can provide false access by false verification.

In an attempt to reduce background noise so as to improve performance of a telephone or a boom microphone or headset or the like located in a noisy environment or the like, pressure gradient microphones may be utilized. Basically, a pressure gradient microphone responds to the difference in pressure at two closely spaced points. When used in an environment where the pressure gradient of the background noise is isotropic, the electrical signal produced by the pressure-gradient microphone due to such background noise is effectively zero. However, in most actual situations, the pressure gradient of the background noise is not isotropic and, as a result, in these situations, the performance of the pressure-gradient microphone is adversely affected. Additionally, since voice or speech propagates in more than one direction, the electrical signal produced by the microphone which corresponds thereto is often degraded. Thus, even if a pressure gradient microphone is utilized in either a telephone handset or a boom microphone, the desired amount of background noise cancellation may not be sufficient and the performance may not be adequate.

Furthermore, since two opposite sides of a pressure-gradient microphone respond to acoustic pressure, as previously mentioned, the handset of an existing telephone would have to be substantially modified so as to enable these two sides of the microphone to respond to the acoustic pressure. Moreover, as a result of using such a microphone in a telephone handset, the electrical signals produced therefrom should be amplified. Thus, to replace the conventional microphone in a telephone handset of an existing telephone with a pressure-gradient microphone would typically necessitate replacing the handset with a new handset and, as such, would be relatively expensive.

As an alternative to using pressure-gradient microphones, an acoustic feed-back type system may be utilized. Such a system normally includes compensation filters which are used to equalize the transfer function of the speakers. Since the characteristics of the speakers are tightly controlled by these filters, the cost of the filters is relatively high. As a result, such acoustic feed-back systems are typically relatively expensive.

Thus, the prior art has failed to provide a relatively low-cost means for reducing background noise to an acceptable level for use with telephones and/or boom microphone devices or the like, and a cost-effective means for enabling existing telephones to reduce background noise to an acceptable level.

OBJECTS AND SUMMARY OF THE INVENTION

An object of the present invention is to provide noise reduction apparatus which overcomes the problems associated with the prior art.

More specifically, it is an object of the present invention to provide noise reduction apparatus which reduces background noise to an acceptable level.

Another object of the present invention is to provide noise reduction apparatus as aforementioned for use with a telephone or boom microphone or headset device or to provide a noise reduction microphone device or the like.

It is still another object of the present invention to provide noise reduction apparatus as aforementioned which is relatively inexpensive.

It is yet another object of the present invention to provide a relatively low-cost noise reduction apparatus for use with telephones which is operable with standard available on-line power.

A still further object of the present invention is to provide a relatively low-cost noise reduction apparatus which is readily adaptable to handsets of existing telephones and which is operable with standard available on-line power.

A yet further object of the present invention is to provide a relatively low-cost noise reduction apparatus for use with telephones or which may be readily adaptable to handsets of existing telephones which enables an operator to selectively amplify a received signal or, which may be used in a boom microphone or headset or, which may be used as a noise canceling microphone.

In accordance with an aspect of this invention, a telephone handset apparatus for use with a telephone operable by standard power supplied to the telephone handset for transmitting and receiving signals representing speech between two or more operators is provided. The apparatus includes a housing having a first microphone means for receiving a first acoustic signal composed of speech from the operator using the apparatus and background noise in the vicinity of the speech and for converting the first acoustic sound to a first signal, and a second microphone means arranged at a predetermined angle with respect to the first microphone means for receiving a second acoustic sound composed of substantially the background noise and for converting the second acoustic sound to a second signal; and a device for subtracting the second signal from the first signal so as to obtain a signal representing substantially the speech.

In another aspect the invention provides a boom microphone or headset device for transmitting and receiving signals representing speech by at least one, preferably two or more operators. The device includes housing having a first microphone means for receiving a first acoustic signal composed of speech from the operator using the device and background noise in the vicinity of the speech and for converting the first acoustic sound to a first signal and a second microphone means arranged at a predetermined angle and/or distance with respect to the first microphone means for receiving a second acoustic signal composed substantially of background noise and for converting the second acoustic sound to a second signal; and an apparatus for subtracting the second signal from the first signal so as to obtain a signal representing substantially speech.

The boom microphone or headset can be used in flight (e.g., helicopter or airplane) or in other settings such as telephones, or voice recognition and/or verification systems for instance, for access to a physical facility or to a computer (either via direct or indirect interface or via telephone lines) or to an automatic teller machine or, in other recognition and/or verification systems. The first and second microphones arranged at a predetermined angle and/or distance with subtraction apparatus disclosed herein can also be used in the area of ambient noise cancellation for microphones in acoustic surveillance or telemetry or even directional microphones such as directional microphones with sidelobes.

Other objects, features and advantages according to the present invention will become apparent from the following detailed description of the illustrated embodiments when read in conjunction with the accompanying drawings in which corresponding components are identified by the same reference numerals.

BRIEF DESCRIPTION OF THE DRAWINGS

FIG. 1 illustrates a telephone having a noise reduction apparatus according to an embodiment of the present invention;

FIG. 2 is a block diagram of the noise reduction apparatus used in the telephone of FIG. 1;

FIG. 4 is a schematic diagram of the block diagram of FIG. 2;

DETAILED DESCRIPTION OF THE PREFERRED EMBODIMENTS

Figure 3A:
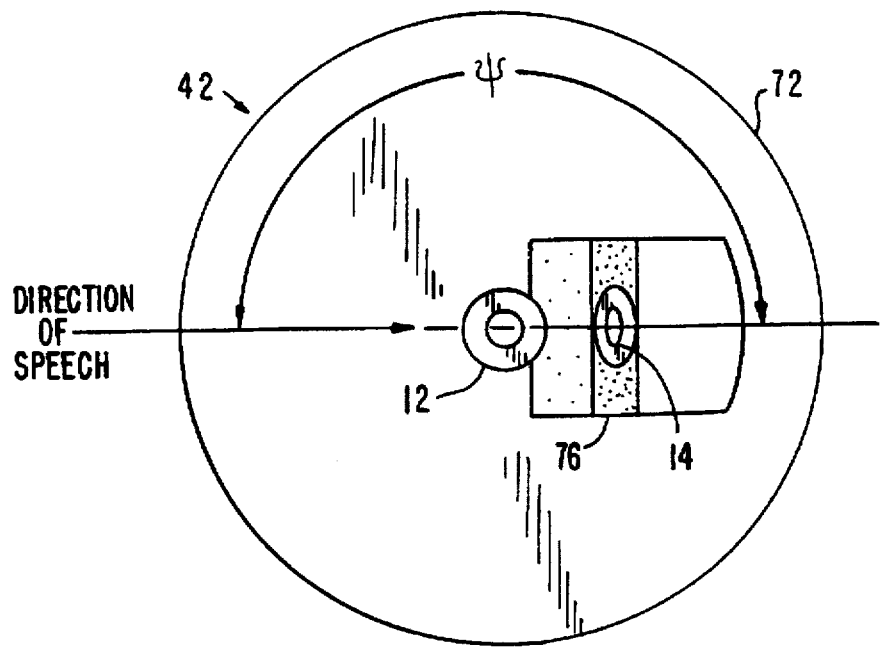
FIG. 3A is a front plan view of the receiver portion of the telephone of FIG. 1.

FIG. 1 illustrates a telephone 8 which utilizes a noise reduction apparatus in accordance with an embodiment of the present invention. As shown therein, the telephone 8 generally includes a handset 10, having a speaker portion 41 and a receiver portion 42, and a telephone unit 18 which may be coupled therebetween byway of a telephone cord 48. Alternatively, the telephone may be a cordless type telephone and, as such, the handset 10 is coupled to the telephone unit 18 by way of RF waves. The receiver portion 42 includes first and second microphones 12 and 14, respectively, (FIG. 2), a switch 40 for adjusting the volume of a signal supplied to the speaker portion 41, and a cap 48 having a recessed portion 44 and a mesh portion 46.

FIG. 2 illustrates the telephone 8 in block diagram form. As shown therein, the handset 10 generally includes first and second microphones 12 and 14, respectively, a subtracting device 16, which in a preferred embodiment is an operational amplifier ("op-amp"), an amplifier 20, which is preferably an op-amp, and a speaker 22. The first and second microphones 12 and 14, respectively, op-amp 16 and amplifier 20 are preferably contained within the receiver portion 42 (see FIG. 1).

Acoustic signals composed of speech or the like and background noise are supplied to the first microphone 12 and converted therein into a corresponding electrical signal which is thereafter supplied to the plus terminal of the op-amp 16. The background noise is supplied to the second microphone 14 and converted therein into a corresponding electrical signal which is thereafter supplied to the minus terminal of the op-amp 16. The op-amp 16 is adapted to subtract the noise signal from the second microphone 14 from the speech and noise signal from the first microphone 12 and to supply therefrom an electrical signal representing substantially the speech to the telephone unit 18 whereupon the speech signal is transmitted therefrom through the telephone lines to a desired telephone or telephones. The output signal from the op-amp 16 is also combined in the telephone unit 18 with a received signal from the telephone lines and supplied to the amplifier 20. The op-amps 16 and 17 are preferably relatively low-power integrated circuits (IC's), such as complementary metal oxide semiconductors (CMOS), and may be constructed from either one or more CMOS IC chips. Although not shown in FIG. 2, amplifier 20 may be selectively set by use of the switch 40 (FIG. 1) by the operator so as to adjust the amplification of the received signal to a desired level. The amplified signal from the amplifier 20 is supplied to the speaker 22, whereupon the amplified signal is converted into an acoustic signal so as to be heard by the operator.

Figure 3B:
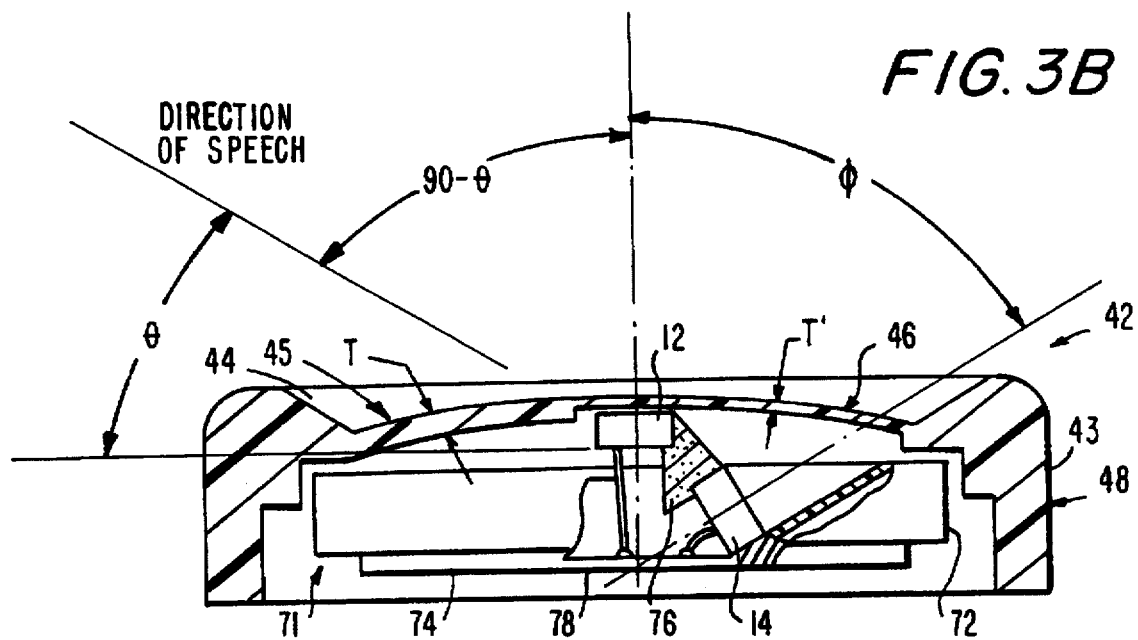
FIG. 3B is a side elevational view of the receiver portion of the telephone of FIG. 1 with the top removed.

FIGS. 3A and 3B illustrate two views of the receiving portion 42, in which the cap 48 is removed in the view of FIG. 3A. As shown therein, the receiving portion 42 generally includes a housing 74, a circuit board assembly 78, the first and second microphones 12 and 14, respectively, and the cap 48. The first and second microphones 12 and 14, respectively, which are preferably electret microphones or similar such microphones, are arranged or positioned as hereinafter described. These microphones are held in place or secured by a holding member 76 which, for example, may be constructed of a foam-like material, which, in turn, is secured to the housing 74. The respective outputs from the first and second microphones 12 and 14 are supplied through respective wires (not shown) to the op-amp 16 which is contained on the circuit board assembly 78 which, in turn, is attached to the housing 74. As hereinafter more fully described, the circuit board 78 may contain additional circuit elements for processing the signals received from the first and second microphones and for amplifying signals for supply to the speaker 22 (FIG. 2). A cover 72 may be utilized which is attached to the housing 74 by use of adhesives or the like or alternatively may be sonically welded together. The cover 72 and the housing 74 with the circuit board assembly 78, holding member 76 and the first and second microphones 12 and 14 form an assembly 71.

The cap 48, which may be constructed from a plastic-type material such as polycarbonate, includes an annular side member 43 and a portion 45 having a typical thickness T which is coupled to the side member 43 and arranged so as to be lower than the upper portion of the side member by a minimum predetermined amount such as 0.020 of an inch, thereby creating a recessed portion 44. The portion 45 includes a portion 46 having a thickness T' which is less than the thickness T and which has a plurality of through holes contained therein and may resemble a mesh-like portion. In a preferred embodiment, the thickness T' of the portion 46 has a thickness of less than 0.030 of an inch. Since the portion 46 represents a relatively small amount of the portion 45, reducing the thickness therein does not adversely affect the overall structural rigidity of the cap 48. Alternatively, the portion 46 may be constructed from a stronger material, for example, stainless steel or such similar material, and combined with the portion 45. As is to be appreciated, by arranging the portions 45 and 46 so as to be recessed from the upper portion of the side member 43, even when the receiver portion 42 is placed on a surface, the side member 43, and not the portions 45 or 46, contact such surface. As a result, any loads are not directly impacted on the portion 45 and/or the portion 46, but are instead delivered to the side member 43.

The cap 48 is positioned over the assembly 71 so that the first and second microphones 12 and 14, respectively, are arranged below the portion 46 with the first microphone positioned relatively close to the underside of the portion 46. Thus, the speech travels a relatively short distance from an operator, who is speaking into the receiver portion 42 from a distance of preferably less than 1 inch, through the portion 46 to the first microphone. As a result, acoustic distortions are minimized.

The arrangement of the first and second microphones 12 and 14, respectively, within the receiver portion 42 is illustrated in FIGS. 3A and 3B. More specifically, as shown in FIG. 3B, the first and second microphones are arranged so as to have an angle $\phi$ therebetween, which preferably has a value in a range between 30° and 60°. The first and second microphones are further respectively arranged so as to have an angle $\theta$ and $[(90-\theta)+\phi]$ between a plane parallel to the receiving or "sensitive" surface of the first microphone 12 and the direction of speech from an operator, and an axis normal to the sensitive surface of the second microphone 14 and the direction of speech, as shown in FIG. 3B; and so as to have an angle $\psi$ between the direction of speech and the second microphone, as shown in FIG. 3A. In a preferred embodiment, the angle $\theta$ has a value of less than approximately 35° and the angle $\psi$ has a value of approximately 180°. As a result of arranging the first and second microphones in this manner, the first microphone 12 receives both the speech from the operator and the background acoustic noise which is present in the vicinity, and the second microphone 14 essentially receives only the same background acoustic noise which is received by the first microphone.

Although, as previously mentioned, the angle $\phi$ has a value which is preferably between 30° and 60°, the first and second microphones 12 and 14, respectively, may nevertheless operate satisfactorily even if arranged so as to have an angle $\phi$ which lies outside this range. However, as the angle $\phi$ becomes substantially smaller than 30° or larger than 60°, the performance may be adversely affected. That is, when the angle $\phi$ becomes substantially smaller than 30°, the second microphone 14 receives both the speech and background noise. As a result, upon subtracting the output signal of the second microphone 14 from the output signal of the first microphone 12, a portion or all of the speech may be canceled. On the other hand, when the angle $\phi$ is substantially larger than 60°, the background noise received by the second microphone 14 may not be similar to that received by the first microphone 12. As a result, subtracting the output signal of the second microphone 14 from the output signal of the first microphone 12 may not adequately cancel the background noise received by the first microphone.

In a like manner, although the angles $\theta$ and $\psi$ have preferred values of less than 35° and approximately 180°, respectively, as previously mentioned, the first and second microphones may operate satisfactorily even if arranged so as to have different values of these angles. However, as the values of the angles $\theta$ and $\psi$ become substantially different from the respective preferred values, the performance may be adversely affected. That is, when the angle $\theta$ becomes substantially larger than 35°, the second microphone 14 may receive both the speech and background noise. Similarly, when the angle $\psi$ is substantially smaller or larger than 180°, the second microphone 14 may receive both the speech and background noise. As a result, in either of these situations, upon subtracting the output signal of the second microphone 14 from the output signal of the first microphone 12, a portion or even all of the speech may be canceled.

As is to be appreciated, by using the above-described devices and materials for the components of the receiver portion 42, the cost for constructing such receiver portion is relatively low. Further, by using CMOS chips, as previously described, the power consumption of the receiver portion is kept relatively low. As a result, the receiver portion may be powered by the standard power available in the handset and, as such, does not require additional power or transformers or the like. Furthermore, although the receiver portion 42 has been described for assembly with the handset 10 of the telephone 8, which is a new telephone, such receiver portion, or a slight variation thereof, may be used in handsets of existing telephones. That is, in this latter situation, the cap and microphone contained within the handset of an existing telephone are merely replaced with the receiver portion 42. Thus, such use of the receiver portion 42 provides a relatively easy and low-cost means to modify a handset of an existing telephone to include the present noise reduction apparatus.

FIG. 4 illustrates a schematic diagram of one circuit arrangement of the telephone 8 shown in FIGS. 1 and 2. As shown in FIG. 4, the first microphone 12 is coupled through a resistor 202, which is adapted to function as a current limiting resistor so as to correct the bias of an output from the first microphone, to an input terminal 200. The first microphone 12 is further coupled through a resistor 210 to the plus terminal of the op-amp 16 and through a resistor 212 to a variable resistor 214. The second microphone 14 is coupled through a variable resistor 208, which is adapted to function as a current limiting resistor so as to correct the bias of an output of the second microphone, to an input terminal 201, and to the minus terminal of the op-amp 16. The limiting resistor 208 is preferably a variable current limiting resistor which enables the level of the output signal from the second microphone to be matched to within a predetermined value to the level of the output signal of the first microphone 12. More specifically, the limiting resistor 208 enables the output signal of the second microphone 14 to be weighted such that when a signal having a similar level is outputted from the first microphone 12, the amplitude of the difference therebetween is minimized. The value of the current limiting resistor 208 can be selected according to minimization criteria. An input terminal 198 is connected to resistors 204 and 206, which are adapted to divide the voltage received at the input terminal 198, and to the minus terminal of the op-amp 16. The output of the op-amp 16 is coupled to capacitors 220, 222 and 226 and resistors 224 and 228 which, in turn, is connected to a "microphone input" terminal of the telephone unit 18. The output from the op-amp 16 is further coupled through a variable resistor 214, a resistor 216 and a capacitor 218 to ground. Resistors 210, 212 and 216 and variable resistor 214 provide variable gain, for example, 20 to 1 amplification, to the output of the op-amp 16. The capacitors 218, 220 and 222 are adapted to remove residual dc (direct current) levels which may be present in the output signal from the op-amp 16. The resistors 224 and 228 and the capacitor 226 are adapted to function as a low-pass filter having a break point at a predetermined value which, for example, may be 3.7 kHz.

The telephone unit 18 is further connected to the telephone lines and is adapted to receive signals through the microphone input terminal and to supply these signals to the desired telephone or telephones by way of the telephone lines. The telephone unit 18 is further adapted to receive signals from another telephone or telephones by way of the telephone lines and to combine such signals with those received through the microphone input terminal, as previously described, and to supply the combined signal to a speaker input terminal 231. The input terminal 231 is connected through a capacitor 230, which is adapted to block dc signals, and a resistor 232 to the minus terminal of an op-amp 17 and through a resistor 234 to a variable resistor 240. An input terminal 199 is connected to the plus terminal of the op-amp 17. The output from the op-amp 17 is connected through capacitors 242 and 244 and a resistor 246 to the speaker 22. The output from the op-amp is further connected through the variable resistor 240, a resistor 238 and a capacitor 236 to ground.

The operation of the telephone 8 shown in FIG. 4 will now be described below.

Upon activating the handset 10, by lifting the handset 10 from the switch hook (not shown) or the like, standard telephone line voltage is applied to input terminals 198, 199, 200 and 201. A signal from the first microphone 12, which has been bias corrected by the current limiting resistor 202, is supplied through the resistor 210 to the plus terminal of the op-amp 16. An output signal from the second microphone 14, which has been bias corrected by the current limiting resistor 208, is supplied to the minus terminal of the op-amp 16. The op-amp 16 subtracts the signal received from the second microphone 14 from that received from the first microphone 12 and outputs the resulting subtracted signal. DC levels which may be present in the output signal are removed and the signal is amplified. High frequency signals, such as those over 3.7 kHz, are then removed from the amplified output signal and the resulting signal is supplied to the telephone unit 18. Thus, a voltage signal is supplied to the telephone unit 18 which is proportional to the difference between the voltages generated by the first and second microphones 12 and 14, respectively.

An output signal from the telephone unit 18, which is a combination of the signals received through the microphone input terminal and the telephone lines, is supplied to the input terminal 231 of the amplifier 20. The signal from the input terminal 231 is supplied to the capacitor 230 so as to remove any dc signals which may be present. The output from the capacitor 230 is supplied through the resistor 232 to the minus terminal of the op-amp 17. The op-amp 17 subtracts the signal from the telephone unit 18 from the signal received from the input terminal 199 and supplies a subtracted signal therefrom. Such signal may be selectively amplified, through the use of resistors 232, 234 and 238 and variable resistor 240, by the operator by use of the switch 40 (FIG. 1). Any dc signals which may be present in the amplified signal are thereafter removed by the capacitors 242, 244 and 236. The output signal from the capacitor 244 is current limited by the resistor 246 and is thereafter supplied to the speaker 22 so as to be converted thereat into an acoustic signal.

Figure 5:
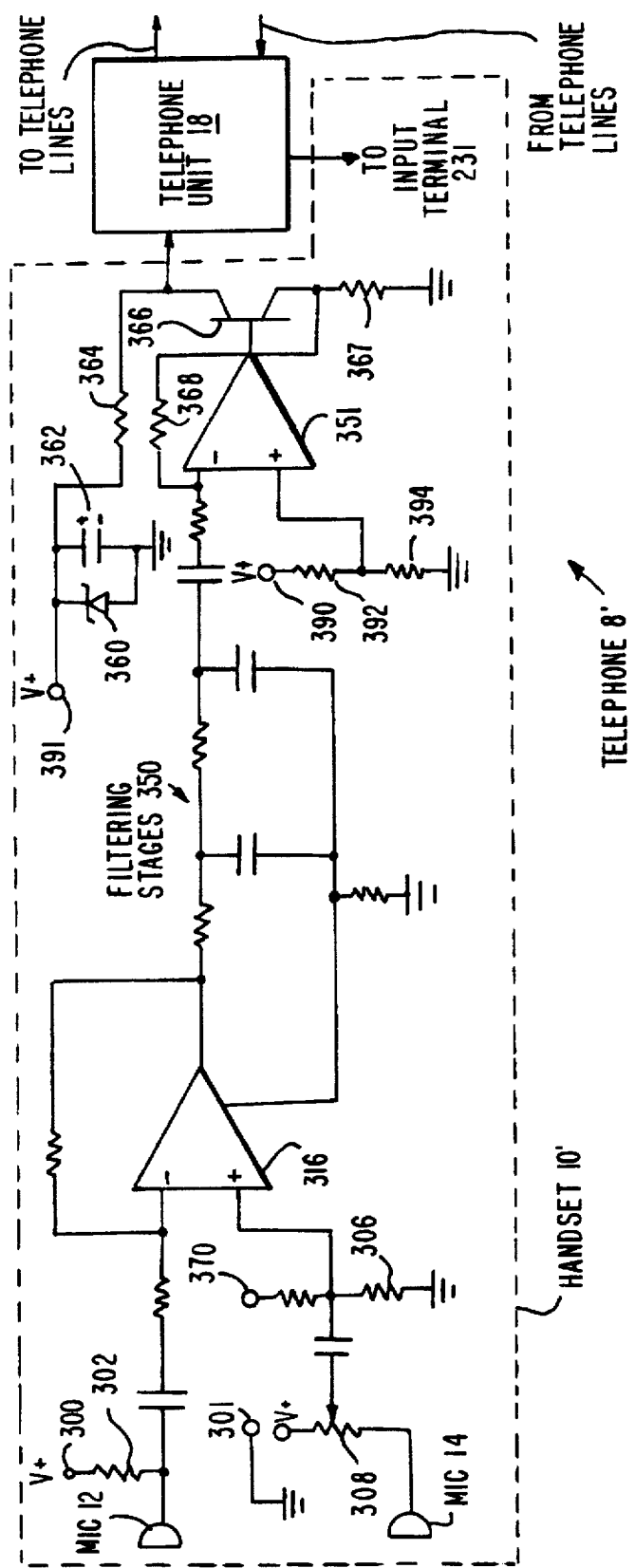
FIG. 5 is another schematic diagram of the noise reduction apparatus illustrated in FIG. 2.

FIG. 5 illustrates an alternative arrangement for processing the signals obtained from the first and second microphones 12 and 14, respectively, so as to provide a current output for supply to the telephone unit 18 which is proportional to the difference of the voltages generated by the first and second microphones.

More specifically, the circuit arrangement of FIG. 5 includes a handset 10' having a plurality of input terminals 300, 301, 370 and 390 which are each adapted to receive standard available on-line power. The first microphone 12 is coupled through a current limiting resistor 302 to the input terminal 300 and is further coupled to the plus terminal of a subtracting device 316, which is preferably a CMOS op-amp. The output from the second microphone 14 is coupled through a variable current limiting resister 308 to the input terminal 301 and is further coupled to the minus terminal of the op-amp 316. The signal outputted from the op-amp 316 is supplied through filtering stages 350 to the minus terminal of a subtracting device 351 which is preferably a CMOS op-amp. The filtering stages 350 are adapted to provide a predetermined frequency response characteristic such as a signal roll-off at a predetermined frequency. As is to be appreciated, although two filtering stages are shown in FIG. 5 any number of filtering stages may be utilized. The input terminal 390 is coupled to resistors 392 and 394, which are adapted to reduce the signal supplied thereto, and to the plus terminal of the op-amp 351. An output signal from the op-amp 351 is supplied to the base of a transistor 366. The input terminal 391 is connected to a Zener diode 360, a capacitor 362 and a resistor 364 which, in turn, is connected to the collector of the transistor 366 and to the microphone input terminal of the telephone unit 18. The emitter of the transistor 366 is coupled through resistors 367 and 368 to the minus terminal of the op-amp 351 so as to provide a feedback loop thereto. The op-amp 351 and the associated components provide electrical isolation between the filtering stages 350 and the transistor 366. The transistor 366 is adapted to amplify the signal supplied to the telephone unit 18.

The output from the telephone unit 18 is coupled to the input terminal 231 (FIG. 4) and is thereafter processed in the manner previously described with reference to the handset 10 of FIG. 4 so as to provide an acoustic signal from the speaker 22.

The operation of the telephone 8' will now be described below.

Upon applying power to the handset 10', by lifting the handset from the switch hook (not shown) or the like, standard telephone line voltage is applied to input terminals 300, 301, 370, 390 and 391. A signal from the first microphone 12, which has been bias corrected by the current limiting resistor 302, is supplied to the plus terminal of the op-amp 316. An output signal from the second microphone 14, which has been bias corrected by the current limiting resistor 308, is supplied to the minus terminal of the op-amp 316. The resistor 308 is preferably a variably current limiting resistor which enables the level of the output signal from the second microphone 14 to be matched to within a predetermined value to the level of the output signal of the first microphone 12, in a manner substantially similar to that previously described for resistor 208. The output difference signal from the op-amp 316 is provided though the filtering stages 350, which may include one or more RC networks or equivalent circuits, so as to limit the upper frequency of the output signal to a predetermined value which, for example, may be 3.7 kHz. The output signal from the filtering stages 350 is supplied to the minus terminal of the op-amp 351 and a voltage signal from the input terminal 390, which has been divided to a predetermined value such as one half thereof, is supplied to the plus terminal of the op-amp 351 which, in turn, calculates the difference therebetween and supplies a corresponding output signal to the base of the transistor 366. The voltage from the input terminal 391 is supplied through the resistor 364 to the collector of the transistor 366. As a result, an amplified signal is supplied from the handset 10' to the telephone unit 18 for supply therefrom through the telephone lines to the desired telephone(s) and for combining with a received signal from the telephone(s) for supply to the input terminal 231 in a manner similar to that previously described with reference to FIG. 4.

The individual circuit components without reference designations depicted in FIGS. 4 and 5 are connected as shown and will not be discussed further, since the connections and values are apparent to those skilled in the art and are not necessary for an understanding of the present invention.

Figure 6A:
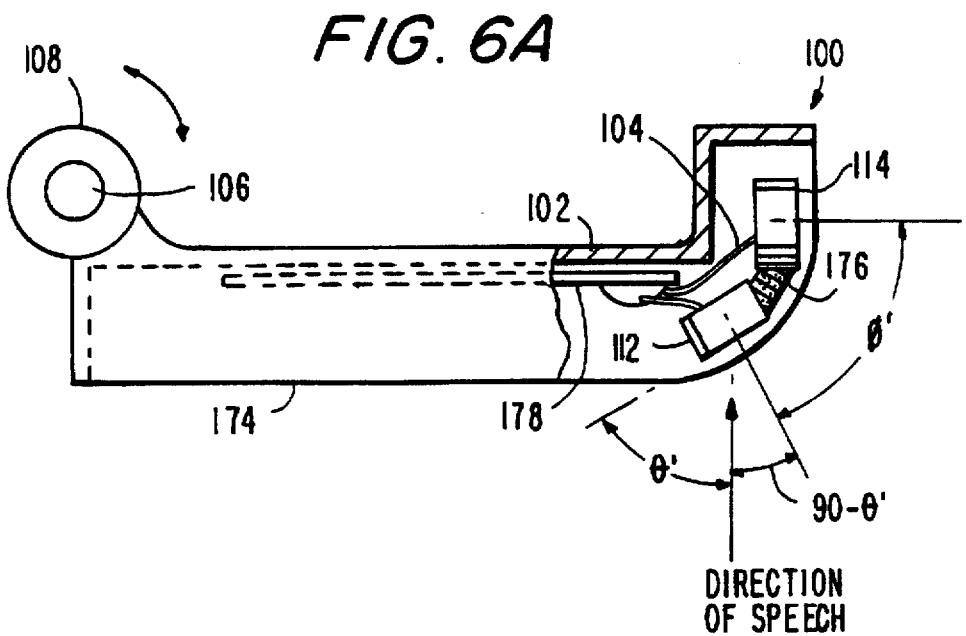
FIG. 6 illustrates a boom microphone device utilizing a noise reduction apparatus according to an embodiment of the present invention.
Figure 6B:
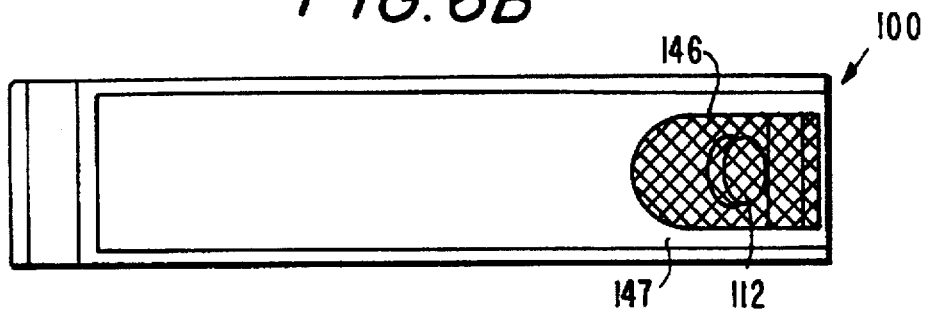
Figure 6C:
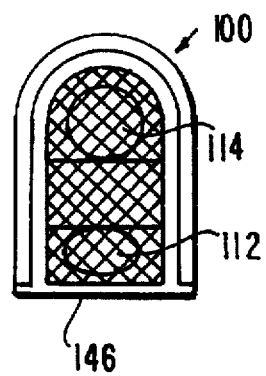

FIGS. 6A, 6B and 6C illustrate a boom microphone 100 which utilizes a noise cancellation apparatus in accordance with an embodiment of the present invention. More specifically, the boom microphone 100 generally includes a housing 174, a circuit board assembly 178, first and second microphones 112 and 114, respectively, and a portion 147. The housing 174, which may be constructed from either a plastic-like or metal-type material, includes a circular portion 108 having a hole therethrough so as to enable a shaft 106 to be inserted therein. As a result, the boom microphone 100 may rotate about the shaft 106 as illustrated in FIG. 6A.

The first and second microphones 112 and 114 are respectively coupled to the circuit board assembly 178 by wires 102 and 104. The circuit board assembly 178 contains circuitry similar to that on the circuit board assembly 78 which, as previously described, processes the signals from the first and second microphones 12 and 14, respectively, for supply to the telephone unit 18 and, as such, in the interest of brevity, will not be further described herein. Therefore, the circuit board assembly 178 is adapted to receive a speech and background noise signal from the first microphone 112 and to subtract therefrom the background noise signal from the second microphone 114 so as to derive a signal which represents substantially the speech. Such signal is supplied to a transmitting device (not shown) so as to be converted to a RF signal and transmitted to a remote receiving device (not shown). The first and second microphones 112 and 114, respectively, are held in place by a holding member 176 which, for example, may be constructed of a foam-like material. A mesh-like screen 146 which, for example, may be fabricated from a plastic-type or a metal material or the like, is attached to the cut away portion 147 so as to protect the first and second microphones. The mesh 146 has a predetermined thickness which, for example, may be approximately 0.030 or less of an inch.

The first and second microphones 112 and 114, respectively, which may be electret microphones, are arranged in a manner similar to that of the previously described first and second microphones 12 and 14, respectively, of the handset 10. That is, the first and second microphones 112 and 114, are respectively positioned so as to have an angle $\theta'$ and $[(90-\theta')+\phi']$ between a plane parallel to the receiving or sensitive surface of the first microphone and the direction of speech from an operator, and between an axis normal to the sensitive surface of the second microphone and the direction of speech, as shown in FIG. 5A. Further, the first and second microphones 112 and 114, respectively, are arranged so as to have an angle $\phi'$ therebetween, which has a preferred value in a range between 30° and 60°. The first and second microphones 112 and 114, respectively, are located in relatively close proximity to the mesh 146 and the cut away portion 147 of the housing 174 so as not to receive acoustic sounds which have been unacceptably distorted.

Although the above embodiments have been described as having only one first microphone 12 (112) and one second microphone 14 (114), the invention is not so limited and any number of microphones may be utilized for the first microphone and/or the second microphone. For example, a receiver portion 42' (not shown) may be configured which includes two or more microphones operating as a first microphone 12' (not shown) and two or more microphones operating as a second microphone 14' (not shown). In this configuration, when using multiple microphones for the first and/or second microphones, respective variable current limiting resistors are preferably provided for all but one microphone for the first microphone 12' and for all microphones for the second microphone 14'. Thus, the outputs from the first and second microphones, 12' and 14', respectively, would comprise a weighted sum of several such microphone output voltages. The current limiting resistors are preferably set to respective values so as to minimize some functional of the difference of the first and second microphones 12' and 14', respectively. The criterion for selecting the values of the current limiting resistor or equivalently the weighting function of each microphone could be selected according to any well known gradient search algorithm, so as to minimize the functional.

Figure 9B:
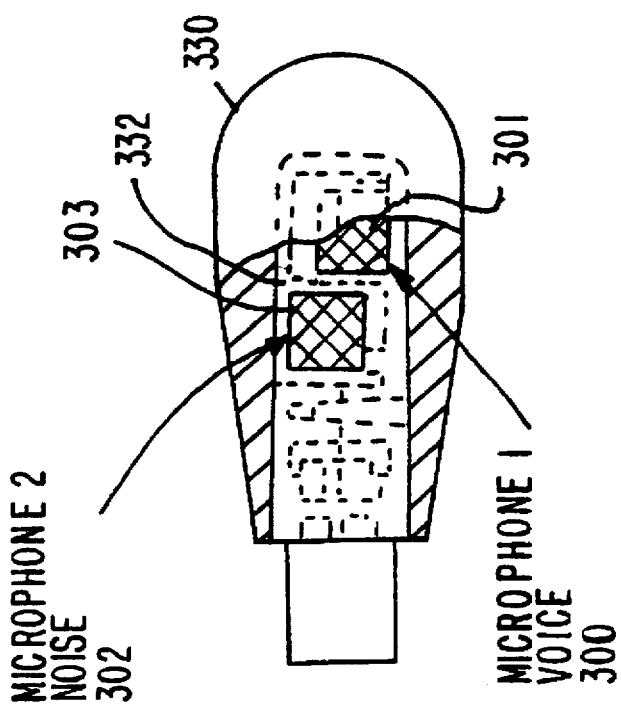
FIG. 9 illustrates boom microphone and headset embodiments of the invention (FIGS. 9A and 9B each showing an embodiment having particular placement of the microphone.
FIG. 9C showing an overview of the headset and FIGS. 9D and 9E showing side views of the boom microphone)
Figure 9A:
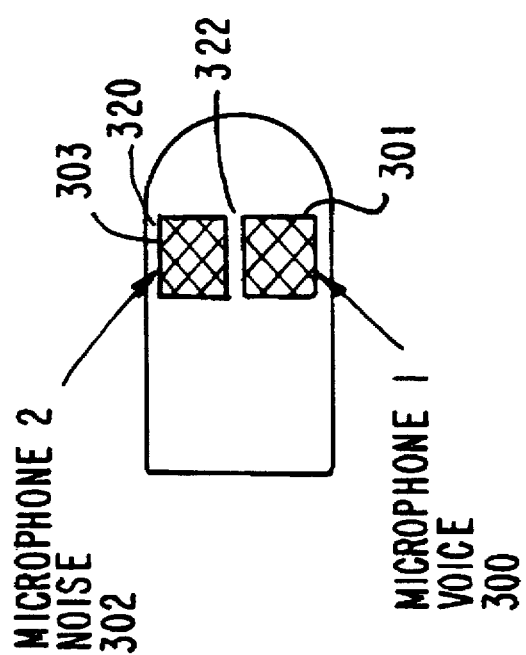

FIG. 9A illustrates a microphone boom 320 having a first microphone 300 and a second microphone 302 arranged therein. The first microphone 300 includes a pressure sensitive surface 301 and the second microphone 302 includes a second pressure sensitive surface 303. As shown in FIG. 9A, the first and second microphones 300 and 302 are arranged such that the respective pressure sensitive surfaces 301 and 303 are substantially 180° apart from each other. The microphones 300 and 302 are further arranged so as to have a structural baffle 322 between the microphones. Such structural baffle 322 may be comprised of a structural member adapted to provide an acoustical separation between the microphones. Alternatively, an acoustical baffling arrangement could be utilized in place of a structural member. Furthermore, as shown in FIG. 9A, the first and second microphones 300 and 302, and in particular their respective pressure sensitive surfaces 301 and 303, are located within a distance or dimension b.

The first microphone 300 is adapted to receive acoustical sound such as speech from a user and to convert such received acoustical speech into a signal corresponding to such speech. Such first microphone 300 may also receive background noise which may exist. As is to be appreciated, such background noise is combined with the speech from the operator and, as such, the signal provided by the first microphone corresponds to both the speech from the user and the background noise. On the other hand, the second microphone 302 is arranged within the microphone boom 320 so as to receive primarily only the background noise. More specifically, the pressure sensitive surface 303 of the second microphone 302 is preferably arranged at an angle of substantially 180° from the pressure sensitive surface 301 of the first microphone 300. Further, as previously mentioned, the first and second microphones 300 and 302 have a baffle 322 arranged therebetween. Such baffle is adapted to minimize or prevent any speech from the user from being received by the second microphone 302. Furthermore, the first and second microphones 300 and 302 are preferably arranged within relatively close proximity to each other, that is, within the distance b. As an example, such distance b may lie within a range of 0.10 to 0.50, preferably about 0.25 of an inch, or less. Suitable distance b may be determined by the skilled artisan from this disclosure, without undue experimentation and, the invention is not necessarily limited to a particular value for b.

FIG. 9B illustrates a microphone boom 330 having first and second microphones 300 and 302 arranged somewhat differently than in the microphone boom 320 of FIG. 9A. That is, as shown in FIG. 9B, the first and second microphones 300 and 302 are located staggered side by side relationship to one another. Further, a baffle 332 is provided between the first and second microphones 300 and 302 so as to provide acoustic separation of the speech in a manner similar to that provided by the baffle 322 of FIG. 9A.

FIG. 9C illustrates a boom headset assembly 400. As shown therein, Such headset assembly 400 generally includes a headband 401, a left case 402 having a left cover 403 and a left cushion 409, a right case 404 having a right cover 405 and a right cushion 410, a microphone boom assembly 413, and a microphone boom 440. Such microphone boom 440 includes first and second microphones 300 and 302 which may be arranged in a manner as previously described with reference to FIGS. 9A and 9B. Further, such microphone boom assembly 440 includes an upper microphone case 406, a lower microphone 407, and the first and second microphones 300 and 302, and a windsock 408.

FIG. 9D illustrates a side view of the boom headset assembly 400. As shown therein, the left case 402 includes a circuit card assembly 412, which may contain circuitry utilized in processing the acoustic signals as hereinafter more fully described, and further includes a cable assembly 411 for supplying signals to and from outside or host equipment (not shown). FIG. 9E illustrates a side view of the right case 404.

Figure 7A:
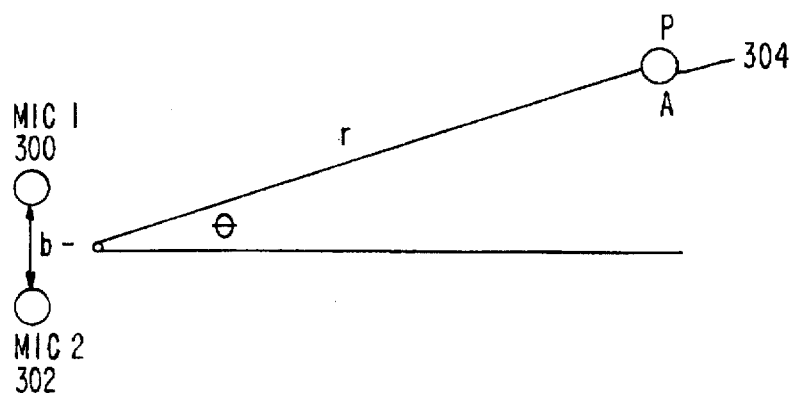
FIG. 7 is schematic diagrams to which reference will be made in explaining the operation of the present invention.
Figure 7B:
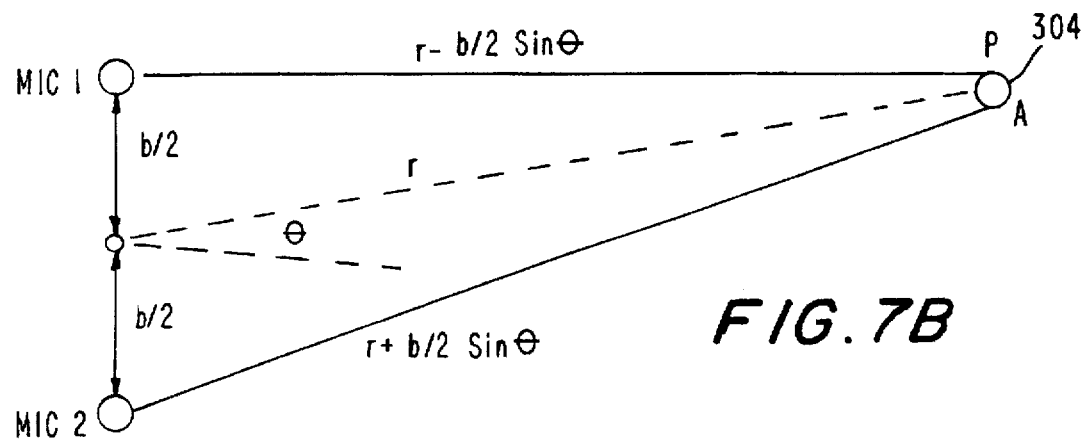

As previously described, the first and second microphones 300 and 302 are preferably arranged within a distance b and are further arranged such that the first microphone 300 receives both speech and background noise while the second microphone receives primarily just the background noise. Such background noise may originate as a pressure sound source from a location 304 as illustrated in FIGS. 7A and 7B. That is, as shown therein, such location 304 may be located at a distance r from a center location between the first and second microphones 300 and 302 so as to form an angle θ therebetween. As a result, the distance between the first microphone 300 and the location 304 is approximately equal to the value $[r-(b/2)(\sin \theta)]$, and the distance between the location 304 and the second microphone is approximately equal to the value $[r+(b/2)(\sin \theta)]$.

Figure 8:
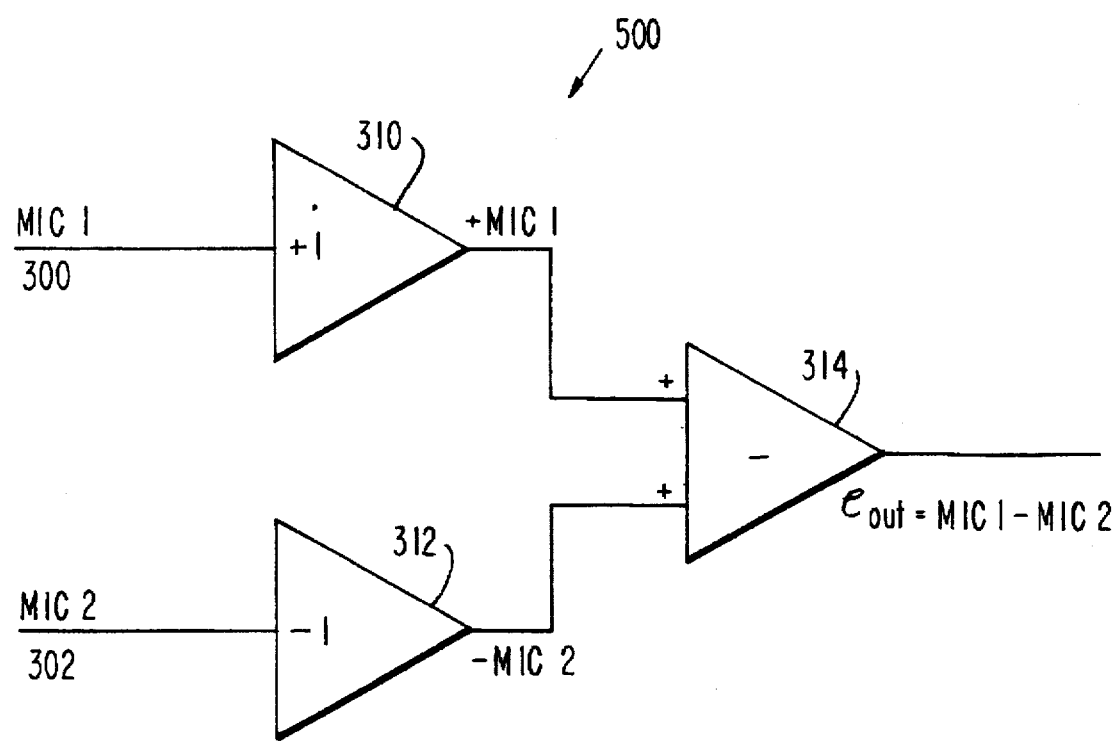
FIG. 8 illustrates of a noise reduction apparatus according to the present invention.

FIG. 8 illustrates a differential amplifier 500 which is adapted to process the signals produced by the microphones 300 and 302. As shown therein, such differential amplifier 500 includes an amplifier 310, an amplifier 312 and a summing circuit 314. The signal produced by the first microphone 300 is supplied to the amplifier 310 which is adapted to provide essentially a unity gain to such signal and provide the same as an output signal. Such output signal is supplied to one input of the summing circuit 314. The signal produced by the second microphone 302 is supplied to the amplifier 312 which is adapted to essentially invert the received signal and to supply the same to a second input of the summing circuit 314. The summing circuit 314 is adapted to add the received signals together so as to produce a summed output signal $e_{(out)}$. As is to be appreciated, such summed output signal $e_{(out)}$ represents a signal corresponding to substantially only the speech from the user.

Figure 10A:
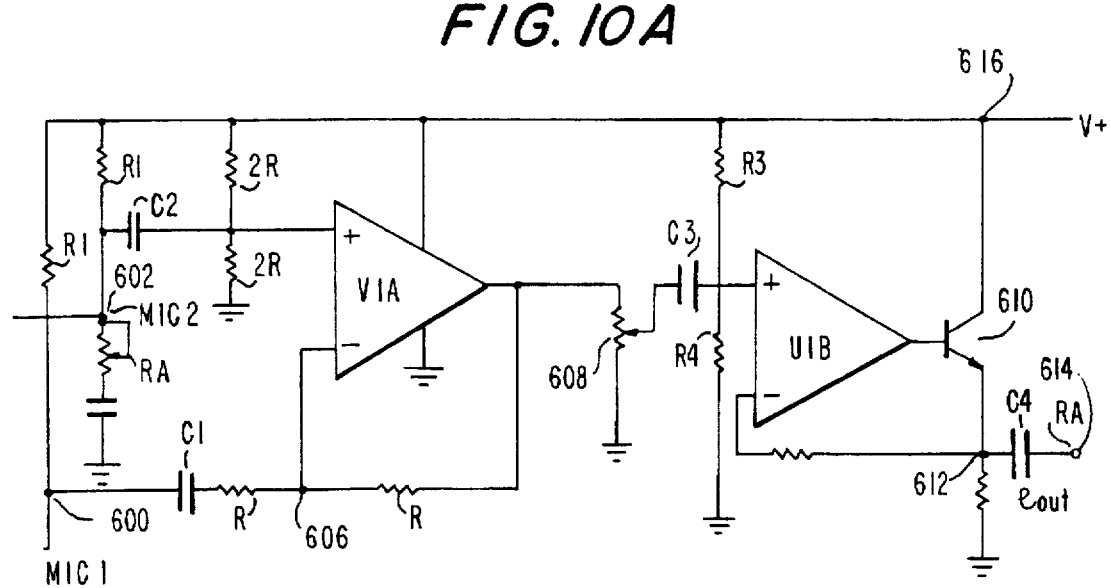
FIG. 10 is schematic diagrams of the noise reduction apparatus of FIG. 8.
Figure 10B:
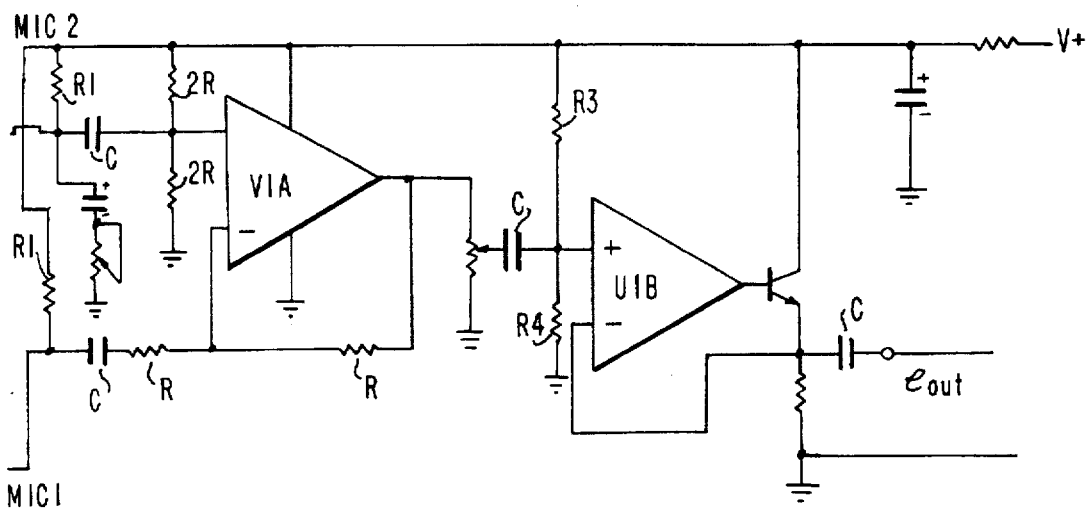

FIGS. 10A and 10B illustrate the differential amplifier 500 of FIG. 8 in more detail. That is, FIG. 10A illustrates a first arrangement of such differential amplifier 500, and FIG. 10B illustrates a second arrangement of such differential amplifier. Each of these schematic diagrams will now be more fully described.

As shown in FIG. 10A, the signal produced by the first microphone 300 is supplied to an input terminal 600 and is supplied therefrom through a Capacitor C1 and a resistor R to an inverting input of an operational amplifier (op-amp) V1A. The signal produced by the second microphone 302 is supplied to an input terminal 602. Such input terminal 602 is coupled to a potentiometer RA which, in turn, is connected to ground. The input terminal 602 is further coupled through a capacitor C2 and resistors R1 and 2R to a non-inverting input of the op-amp V1A. Such op-amp is adapted to operate in a differential mode and provides an output signal therefrom to a terminal 606 which, in turn, is coupled to the converting input of the op-amp V1A. Such output from the op-amp V1A is further supplied to a potentiometer 608 which, in turn, has one end connected to ground. Such potentiometer 688 is coupled through a coupling capacitor C3 to a non-inverting input of an op-amp V1B. The output of such op-amp V1B is supplied to the base of a transistor 610. The emittor of such transistor 610 is coupled to a terminal 612 which, in turn, is coupled through a capacitor C4 to an output terminal 614. The summed signal $e_{(out)}$ is supplied from the terminal 614. The collector of the transistor 610 is coupled to a terminal 616 which, in turn, is connected to a power supply (not shown) which supplies a voltage V+ to the circuit. The terminal 616 is connected to resistors R3 and R4 which are adapted to provide a DC bias. The elements not specifically described are connected as illustrated in FIG. 10A.

By utilizing the above-described circuit illustrated in FIG. 10A, the impedance to the first and second microphones 300 and 302 is symmetrically balanced so as to minimize differential phase shifts between frequencies. Further, the output signal from such circuit has a relatively low impedance.

FIG. 10B illustrates a second or alternate circuit of the differential amplifier 500 of FIG. 8 as previously described. The circuit of FIG. 10B is adapted to receive power through a source resistance from a power supply (not shown). That is, the power for driving the circuit of FIG. 10B is supplied from a power supply having a finite output resistance R unlike that supplied from a power supply having a zero output resistance (such as that of FIG. 10A). Otherwise, as is to be appreciated, the circuit illustrated in FIG. 10B is substantially identical to that of FIG. 10A and as such, will not be further described herein.

Figure 11:
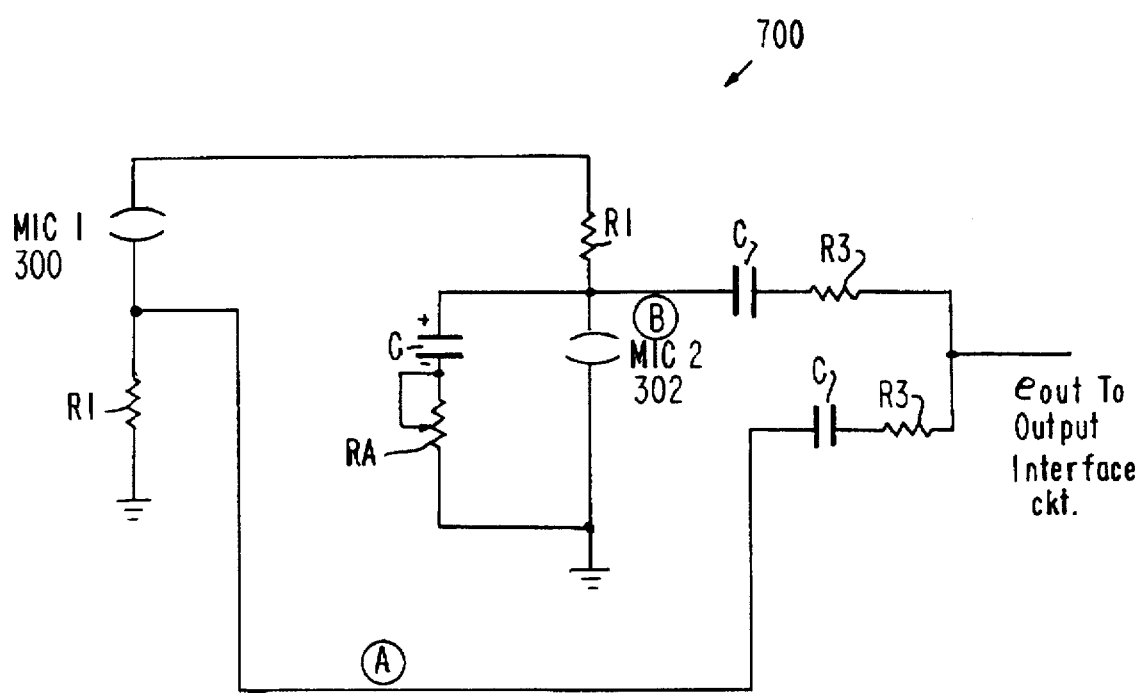
FIG. 11 illustrates a phase reversing circuit.

FIG. 11 illustrates a phase reversing circuit which may be utilized in place of the circuits illustrated in FIG. 10A or FIG. 10B. As illustrated therein, such circuit 700 generally includes the first and second microphones 300 and 302, the magnitude adjustment potentiometer RA, resistors R1 and R3, and capacitors C which are coupled as illustrated in FIG. 11. Each of the first and second microphones 300 and 302 may include a field effect transistor (FET) in which the drain of such FET may be considered a positive (+) and the source of such FET may be considered a negative (−). The phase between such drain and source is approximately 180°. For example, the drain thereof may have a phase of 180°, whereas the source has a phase of 0°. As a result, each of the first and second microphones 300 and 302 includes two terminals, that is, a positive (+) terminal and a negative (−) terminal. In the circuit of FIG. 11, the positive (+) terminals of the first and second microphones may be the upper terminals thereof, whereas the negative (−) terminals of such microphones may be the lower terminals thereof. Further, the magnitude adjustment potentiometer RA may be adjusted or set during the initial assembly thereof or alternatively may be adapted so as to be adjustable by an operator of the boom headset assembly 400 of FIG. 9C. The output signal $e_{(out)}$ has a value of zero (0) when an acoustical sound having the same pressure is received by both the first and second microphones 300 and 302.

Figure 12:
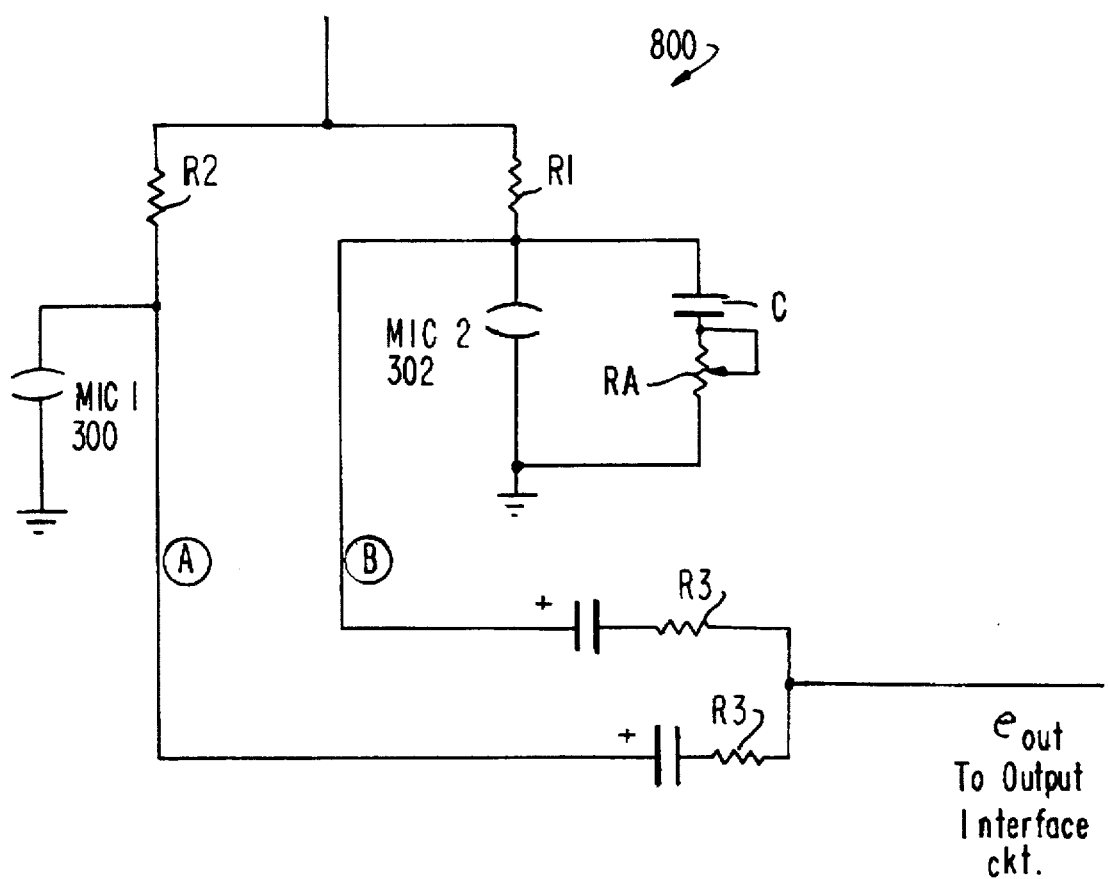
FIG. 12 illustrates an oppositely charged microphone circuit.

FIG. 12 illustrates a circuit 800 which may be utilized in place of the phase reversing circuit 700 of FIG. 11. In the circuit 800, the microphones 300 and 302 are oppositely charged. As a result, when the outputs thereof are summed together, as when the first and second microphones receive an acoustical sound having the same pressure, the output signal $e_{(out)}$ has a value of substantially zero (0). The remaining portions of the circuit 800 are substantially similar to those of the circuit 700 of FIG. 11 and, as such, will not be further described herein.

Thus, either of the circuits illustrated in FIGS. 10A, 10B, 11 or 12 may be utilized in the present invention. Such circuits enable calibration processing to be performed on the first and second microphones 300 and 302 which may be electret-type microphones. Further, such circuits may be included on a printed circuit (pc) board which may be installed within the headset assembly 400 as, for example, as on the pc board 412 illustrated in FIG. 9D. Alternatively, such pc board may be included in other locations of the headset assembly 400 or alternatively may be located on host equipment which is removed from the headset assembly 400.

Thus, the present invention provides an assembly and, in particular, a boom headset assembly, which is adapted to reduce or eliminate background noise. Such present apparatus utilizes first and second microphones which act as a dipole arrangement and which may be matched by the manufacturer or by testing after manufacture, have a frequency response which is essentially flat over the anticipated operating range. Further, such first and second microphones are preferably arranged such that their respective pressure sensitive surfaces are arranged at 180 mechanical degrees from each other and are located in close proximity thereto as previously described. By so arranging the first and second microphones, a sound (in particular a background noise) originating from a source which is located at a distance substantially greater than the distance between the microphones, enables the sound from such sound source to be received by both microphones simultaneously. As a result, no substantial phase differential therebetween occurs. Furthermore, the present invention enables the amount of noise cancellation to be adjusted either during the fabrication of the present boom headset assembly or alternatively by an operator utilizing such assembly.

The boom microphone, for instance, of FIGS. 7A to 13B, can be based upon the principles governing the directivity patterns of omni-directional microphones in the near and far fields and the correct placement of the microphone's pressure sensitive surfaces. The physical design of the microphone as seen in FIGS. 9A and 9B is the determining factor in the S/N increase. Examination of these drawings shows that the microphone pressure sensitive surfaces are preferably placed at 180 mechanical degrees from each other, and provide the optimum separation of the signal going to the voice microphone and noise microphone in the near field. This separation is a primary component in the determination of the signal in the S/N ratio. Basically a problem in the far field is to add vectorially, at a desired point, the sound pressures arriving at that point from all simple sources. The basic element of this analysis will be what is herein called the Doublet Sound Receiver. The geometric situation is shown in FIG. 7A and 7B. It is assumed that the distance r from the two receiving microphones to point A at which the pressure P originates is large compared with the separation b between the two microphones. The spherical sound wave from point A arriving at the receiving doublet will have traveled r−b/2 sin θ for mic 1 and r+b/2 sin θ for mic 2. If r>>b, the distance traveled by the spherical wave is r, and the output of each receiving microphone is equal. If the summed outputs of the two microphones are zero as in FIG. 8, then the associated scale factors are equal. If their associated scale factors are not equal, phase and/or amplitude, the output will not be zero. Amplitude adjustment can be obtained electrically and is performed, but phase adjustment is impossible at all frequencies. The requirement for phase adjustment is not required because reproducibility is inherent in the manufacture of the microphones and they provide outputs of tracking phase with frequency.

The microphones just described are the dual of a doublet sound source and are similar to the theory of dipoles. In addition, if the spacing b, between the microphones is small (b<<λ) compared with the wavelengths at any distance r, the two microphones essentially coalesce and the output at any angel 0 will be zero for matched scale factors (magnitude/ phase) at any frequency. If b is not much smaller than r, the phase relationship between the two microphones to an incoming sound wave is:

Where b=spacing between sensor mic and noise mic
f=frequency in hz
v=speed of sound in/sec
φ=phase shift at a specific frequency $$\phi = \frac{360\, bf}{v} \quad (1)$$

As can be seen from equation (1), this phase relationship is the theoretical limit for the crossing of the near and far fields of the noise canceling microphone. As the frequency changes at a fixed b, the phase changes, ie: at φ=90, there may be no cancellation at all. This phase change, in the absence of baffles can be a governing factor in the bandwidth of the cancellation.

The embodiment of the invention of FIGS. 7A to 13B can use on the far field pattern of the microphones for cancellation. The reduction of the effect of b, is performed by the use of an acoustic design that tends to minimize or reduce to zero, dimension b, in FIG. 9A, and that is modified to reduce the thickness of the probe as in, FIG. 9B. Both designs use the relationship between b and r (ie: b<<r).

In addition, the boom microphone/system of the invention is optimumly defined by the location of the microphone's pressure surfaces, preferably 180 degrees in the case of the boom microphone, but cancellation will occur because of our subtraction type system at all angles. In fact, when the microphone pressure surfaces are at 0 degrees with respect to each other total cancellation could be theoretically obtained but no voice would be transmitted. The inventive system can rely on the directivity patterns of the microphones in the near and far fields, orientation of their pressure sensitive surfaces, and the electrical process of subtraction.

The typical circuits that can be utilized for subtraction are shown in FIGS. 10A–12.

In FIG. 10A and 10B, the circuit is similar to the circuits utilized in the telephone embodiments above-described with respect to FIGS. 1 to 5. In this circuit U1A is utilized for the subtraction, and U1B is utilized for output interfacing.

The phase reversing circuit is shown in FIG. 11. This circuit will provide two signals at points A and B 180 degrees out of phase with identical sound signals in microphones 1 and 2, if the microphones are matched parts (by manufacture). This output can be adjusted for amplitude matching at a reference frequency by adjustment of RA in conjunction with capacitor C. The signal at $e_{out}$ is the noise canceled output when the microphones are placed in the appropriate mechanical environment mentioned previously.

Analysis of the circuit of FIG. 11 can be shown to provide the following information. The output at A is at the Source of the internal FET contained within the microphone (preferably electret) such that its output is at an electrical angle of 0 degrees with the input pressure signal, while the output at B is from the Drain of the internal FET contained within electret microphone and its output is at an electrical angle of 180 degrees with the input pressure signal. When these two far field signals are summed together in a voltage mode, the output is zero if the amplitude is adjusted by potentiometer RA at a reference frequency and the magnitude response is flat across the frequency spectrum.

In the circuit in FIG. 12, the oppositely charged microphones provide two signals at A and B 180 degrees out of phase with identical sound signals at microphones 1 and 2. This phase reversal is accomplished by virtue of opposite charging during manufacture of the electret microphone condenser plates.

All of the other characteristics are as previously stated for the phase reversing circuit. Circuits of the type found in FIGS. 11 and 12 provide for electrical subtraction without the need for using an op amp.

The boom microphone headset device of the invention (e.g. FIGS. 7A–13B) can provide for computer voice recognition. The boom microphone headset provides superior rejection of unwanted background noise and excellent voice response. The boom microphone headset can be configured to be compatible with all Sound Blaster™ audio cards. All other audio card interfaces are also easily accommodated.

The inventive boom microphone headset (e.g., FIGS. 7A–13B) coupled with the latest in high quality voice recognition software advances computer control with Voice to a reliability and user friendliness level equal to the keyboard and mouse. With the present invention, voice recognition is no longer confined to quiet closed door offices, but can be used in real-world noisy environments such as hotel lobbies, hospital emergency rooms, manufacturing facilities and noisy office areas. Thus, the boom microphone headset can interface with computers, telephones or other equipment in the real world or, the boom microphone (without headset) can be employed in various voice recognition applications.

The inventive boom microphone headset is designed to be sensitive to distance from the sound source. Arbitrary sound fields which emanate from more than a few inches away from the microphone are substantially canceled by up to 30 dB (3200%).

The inventive boom microphone headset preferably is connected to 3 meter cable which terminates in a 3.5 mm miniature plug (not shown). To connect it to the sound card, the user simply inserts the miniature plug into the Microphone input jack of the sound card (not shown). The inventive boom microphone headset then is placed on the user. The headset preferably has two features to help position the microphone in the proper position for reliable voice recognition: (1) adjustable temple pads on both the right and left sides and (2) an adjustable flex boom. The microphone at the end of the flexible boom preferably has a white or other color-coded dot indicating the voice-side of the microphone which should be adjusted to directly face the mouth. Proper close talking into the invention is helpful for accurate operation. Preferably the distance from the mouth to the microphone should be in the range of about ¼ to about ¾, preferably about ½ inch or less.

As to use with the Sound Blaster™, it is important to disable Automatic Gain Control (AGC) on the sound card before using the present invention in noise canceling applications. If AGC is ON, it will defeat the noise cancellation properties of the microphone by automatically turning up the input audio volume when the user is not speaking. The AGC can be disabled on Sound Blaster™ cards by running Creative Mixer™ and clicking on the AGC software control under "Recording Settings . . . ". The input audio gain is easily tailored to the target application using the Creative Mixer™ program. Testing of the inventive microphone headset can easily be performed by using the record and playback features of the Creative Labs Wave Studio™ program.

Figure 13A:
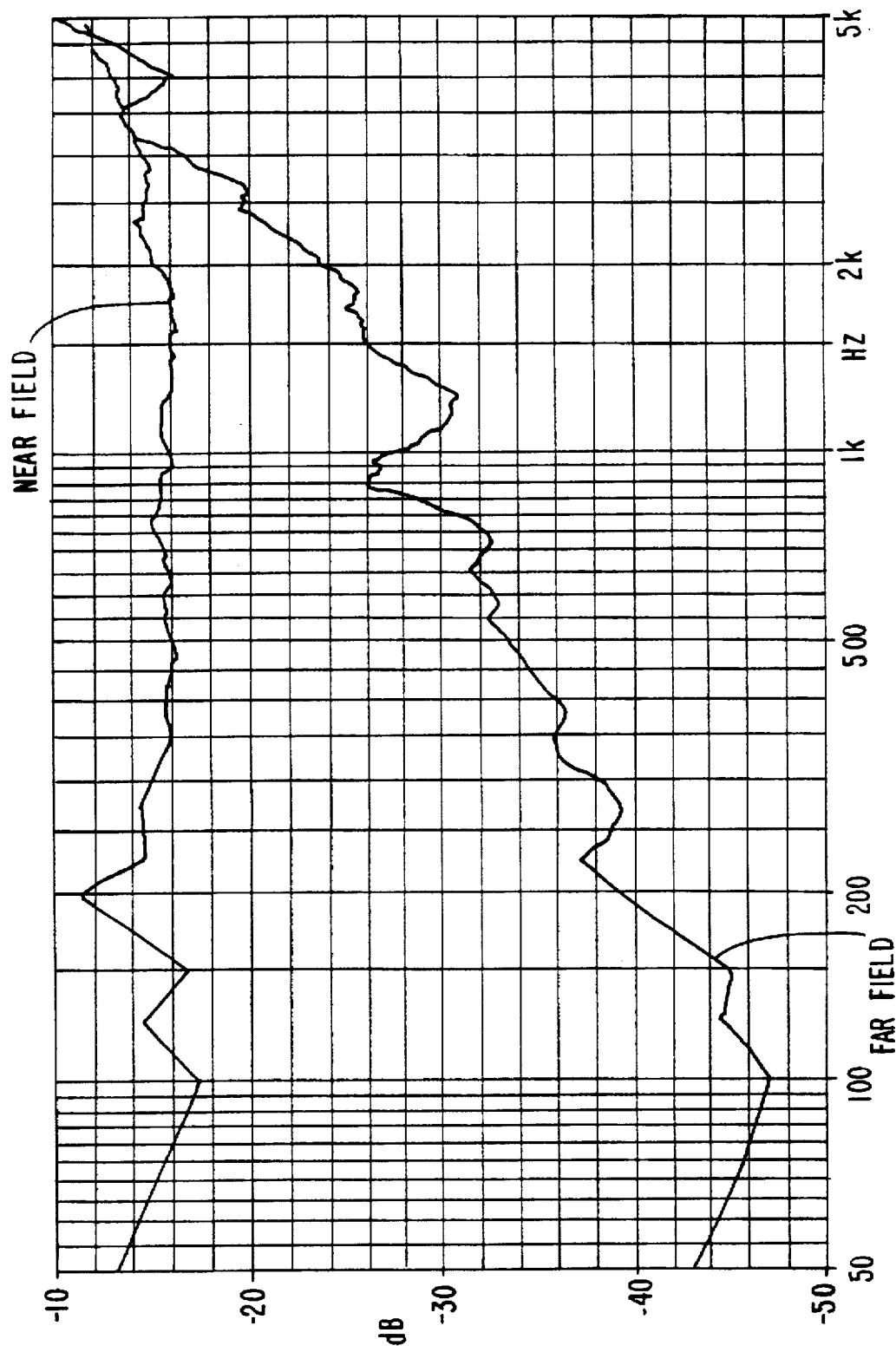
FIG. 13 illustrates active cancellation curves from embodiments of the invention.
Figure 13B:
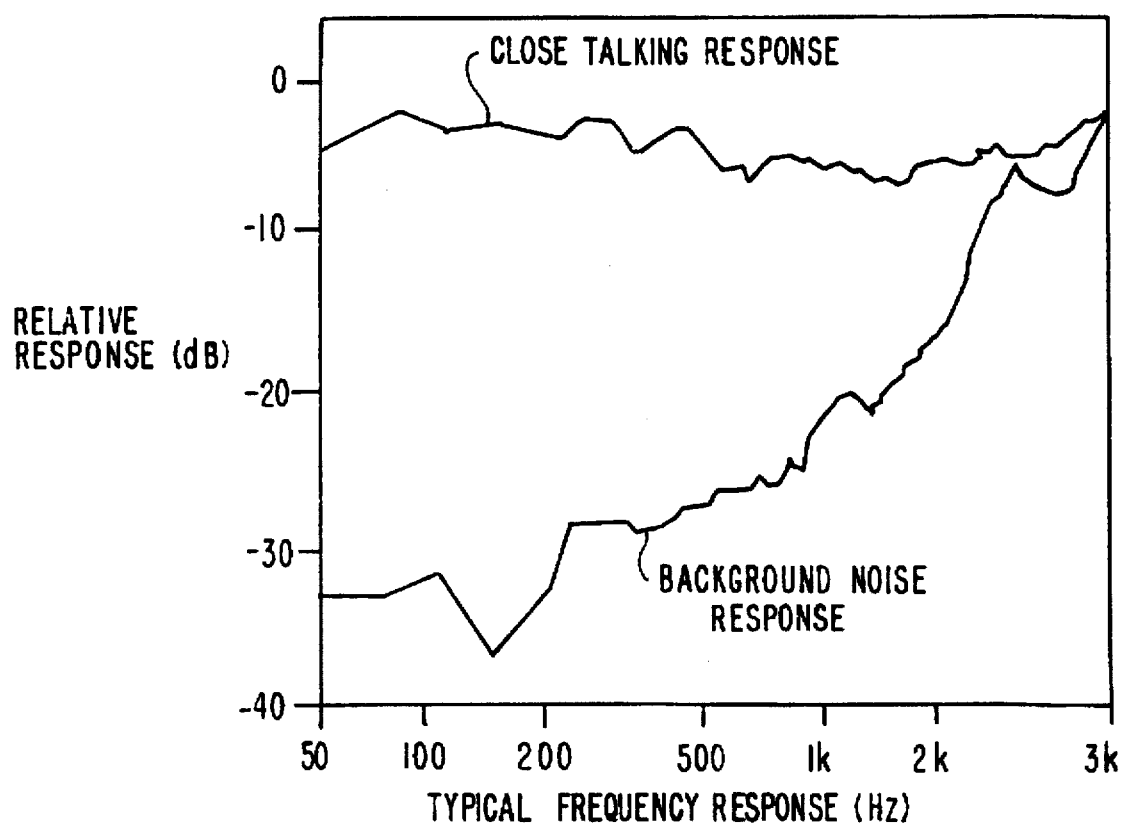

FIGS. 13A and 13B are active noise cancellation curves of the boom microphone in a headset embodiment with FIG. 13A, top line, representing near field response and FIG. 13A, bottom line, representing far field response. In FIG. 13B, the top line represents the close talking response and the bottom line represents the background noise response. Typical specifications for an embodiment of the inventive boom microphone headset include
Frequency Resp: 20 Hz to 10 kHz
Output Impedance: Low Impedance
  (Capable of driving 560 ohm)
Sensitivity: −47 dB±2 dB
  (0 dB=1 v/Pa @ 1 kHz, 5V)
Operating Voltage: 2V to 10V
Current: <1 mA (power supply 5V)
Electrical S/N: 60 dB (minimum)
Noise Cancellation: See FIG. 13B
Cable Type: Non-detachable, shielded
Length of Cable: 3000±50 mm
Plug Type: 3.5 mm stereo miniature.
  male
Weight: 56 gm (without cable)

Using interpretation of speech intelligibility AI and ANSI S3.5-1969, a boom microphone headset of the invention and a standard (prior art) dynamic noise canceling microphone were tested and the results were as follows:

ARTICULATION INDEX: INVENTIVE BOOM MICROPHONE

| ⅓ Octave Band Center Freq. (Hz) | S/N (dB) [NPR-FPR] | Weight Factor (BW Corrected) | Articulation (1) Weight (W) |
|---|---|---|---|
| 200 | 26.6 | 0.00046 | 0.01219 |
| 250 | 24 | 0.0012 | 0.0288 |
| 315 | 22 | 0.0012 | 0.0264 |
| 400 | 20.5 | 0.0016 | 0.0328 |
| 500 | 17.5 | 0.0016 | 0.028 |
| 630 | 16 | 0.0023 | 0.0368 |
| 800 | 15 | 0.0023 | 0.0345 |
| 1000 | 12 | 0.0028 | 0.0336 |
| 1250 | 15 | 0.0035 | 0.0525 |
| 1600 | 9.5 | 0.0043 | 0.04085 |
| 2000 | 9 | 0.0044 | 0.0396 |
| 2500 | 5 | 0.0039 | 0.0195 |
| 3150 | 1 | 0.0039 | 0.0039 |

ARTICULATION INDEX: STANDARD (PRIOR ART) DYNAMIC NOISE CANCELLATION MICROPHONE

| ⅓ Octave Band Center Freq. (Hz) | S/N (dB) [NPR-FPR] | Weight Factor (BW Corrected) | Articulation (1) Weight (W) |
|---|---|---|---|
| 200 | 25.5 | 0.00046 | 0.01173 |
| 250 | 18 | 0.0012 | 0.0216 |
| 315 | 12 | 0.0012 | 0.0144 |
| 400 | 11 | 0.0016 | 0.0176 |
| 500 | 5.5 | 0.0016 | 0.0088 |
| 630 | 3 | 0.0023 | 0.0069 |
| 800 | 0 | 0.0023 | 0 |
| 1000 | 4 | 0.0028 | 0.0112 |
| 1250 | 3.5 | 0.0035 | 0.01225 |
| 1600 | 5 | 0.0043 | 0.0215 |
| 2000 | 2.2 | 0.0044 | 0.00968 |
| 2500 | 3 | 0.0039 | 0.0117 |
| 3150 | 2 | 0.0039 | 0.0078 |

Interpretation of speech intelligibility using AI and ANSI S3.5-1969 shows an accuracy level of 93% for the present invention versus an accuracy level of only 45% for the Standard Dynamic Noise Canceling Microphone. A comparison of this data reflects a reduction in error ratio of approximately 8:1 by the present invention (i.e., AI 45% std Dynamic Mic, Noise Canceling AI 93% by present invention). Furthermore, additional AI is expected when constants are corrected to be active down to 50 cycles and below. Literal evaluation of the AI calculation states that for every 100 words spoken, the present invention will commit 7 errors, and Standard Dynamic Microphones will commit 55 errors. All data and calculations were collected and performed at Andrea Electronics Corporation. Both microphone systems were tested at Andrea Electronics Corporation under the same conditions.

Further, although the above-described embodiments of the present invention have been described for use with telephone handsets and boom microphones and the like, the present invention is not so limited and may be used with numerous other devices such as intercom systems, telemetry, acoustic surveillance microphones, directional microphones and so forth. Further, the invention can be utilized in voice recognition and/or verification systems such as systems for access to physical facilities, computer programs, computers or automatic teller machines and the like. Additionally, the present invention may be used with processing devices operating in accordance with predetermined processing algorithms, as described in U.S. Pat. No. 5,251,263, which has a common assignee with the present application, and which is hereby incorporated by reference; however, such is not believed necessary to the invention.

Furthermore, although preferred embodiments of the present invention and modifications thereof have been described in detail herein, it is to be understood that this invention is not limited to those precise embodiments and modifications, and that other modifications and variations may be affected by one skilled in the art without departing from the spirit and scope of the invention as defined by the appended claims.

What is claimed is:

1. Noise reduction apparatus comprising: a housing having first omnidirectional microphone means for receiving a first acoustic sound composed of speech originating from an operator operating said apparatus and background noise, and for converting said first acoustic sound to a first signal, and second omnidirectional microphone means arranged in close proximity up to about 0.5 inches to thereby act as a dipole at a predetermined angle $\phi$ with respect to said first omnidirectional microphone means for receiving a second acoustic sound composed of substantially said background noise and for converting said second acoustic sound to a second signal whereas the first omnidirectional microphone means and the second omnidirectional microphone means are directly connected without any intermediate circuitry to a means for subtracting; and the means for subtracting said second signal from said first signal so as to obtain a signal representing substantially said speech.

2. The noise reduction apparatus according to claim 1, wherein at least one of said first and second microphone means includes a plurality of omnidirectional microphones.

3. The noise reduction apparatus according to claim 1, wherein the first and/or second omnidirectional microphone means comprises a plurality of noise canceling microphones and outputs from the first and/or second omnidirectional microphone means comprises a weighted sum of several microphone output voltages which are weighted according to a desired function.

4. The noise reduction apparatus according to claim 3, wherein the desired function is a gradient search algorithm.

5. A microphone apparatus for reducing background noise, said apparatus comprising:

a housing;

a first omnidirectional microphone having a first pressure sensitive surface and arranged within said housing so as to receive a first acoustic sound composed of speech originating from an operator operating said apparatus and said background noise, said first omnidirectional microphone for converting said first acoustic sound to a first signal;

a second omnidirectional microphone having a second pressure sensitive surface and arranged within said housing so as to receive a second acoustic sound composed of substantially said background noise, said second omnidirectional microphone converting said second acoustic sound to a second signal, said second pressure sensitive surface being arranged in close proximity up to about 0.5 inches at a predetermined angle with respect to said first pressure sensitive surface whereas the first omnidirectional microphone means and the second omnidirectional microphone means are directly connected without any intermediate circuitry to a means for subtracting;

the means for subtracting said second signal from said first signal so as to obtain a signal representing substantially said speech; and wherein the first and second microphones are in close proximity to each other to thereby act as a dipole.

6. A microphone apparatus according to claim 5, wherein said predetermined angle is substantially 180 degrees.

7. A microphone apparatus according to claim 6, wherein said first and second sensitive surfaces are located less than a predetermined amount from each other.

8. A microphone apparatus according to claim 7, wherein said predetermined amount is approximately 0.25 of an inch.

9. The noise reduction apparatus according to claim 1, wherein said predetermined angle $\phi$ lies within a range from approximately 30 degrees to approximately 60 degrees.

10. The noise reduction apparatus according to claim 9, wherein said first omnidirectional microphone means is arranged in said housing such that an angle $\theta$ formed between a plane passing through a portion of said first omnidirectional microphone means which receives said first acoustic sound and an input direction of said speech is less than approximately 35 degrees.

11. The noise reduction apparatus according to claim 10, wherein said second omnidirectional microphone means is arranged in said housing such that an angle $\beta$ formed between an axis normal to the receiving portion of said second omnidirectional microphone means and said input direction of said speech is approximately equal to $[(90-\theta)+\phi]$ degrees.

12. The noise reduction apparatus according to claim 1, wherein the first and second omnidirectional microphone means are electret microphones having matching frequency, phase and gain characteristics.

13. The microphone apparatus according to claim 7, wherein said predetermined amount is in a range of 0.10 to 0.50 inches.

* * * * *